(12) United States Patent
Hansen, III et al.

(10) Patent No.: US 7,669,609 B2
(45) Date of Patent: Mar. 2, 2010

(54) UNIVERSAL REFRIGERATION VALVE

(75) Inventors: Charles C. Hansen, III, Hinsdale, IL (US); Eric J. Guldberg, Darien, IL (US)

(73) Assignee: Parker-Hannifin Corporation, Cleveland, OH (US)

( * ) Notice: Subject to any disclaimer, the term of this patent is extended or adjusted under 35 U.S.C. 154(b) by 883 days.

(21) Appl. No.: 11/423,050

(22) Filed: Jun. 8, 2006

(65) Prior Publication Data

US 2007/0284003 A1     Dec. 13, 2007

(51) Int. Cl.
*F15B 13/00*     (2006.01)
(52) U.S. Cl. .................. 137/269; 137/271; 251/291; 251/367
(58) Field of Classification Search .......... 137/269, 137/271, 50, 484.6, 487, 489; 251/128, 291, 251/292, 366, 367
See application file for complete search history.

(56) References Cited

U.S. PATENT DOCUMENTS

| | | | |
|---|---|---|---|
| 651,927 A | 6/1900 | Marsh | |
| 781,913 A | 2/1905 | Schutte | |
| 917,443 A | 4/1909 | Jahn | |
| 925,812 A | 6/1909 | Jahn | |
| 1,611,079 A | 12/1926 | Roschanek | |
| 2,566,774 A | 9/1951 | Otis | |
| 3,754,730 A * | 8/1973 | Nilles et al. | 137/494 |
| 4,022,114 A | 5/1977 | Hansen, III et al. | |
| 4,172,466 A | 10/1979 | Pattarini et al. | |
| 4,647,740 A | 3/1987 | Hansen, III et al. | |
| 4,809,129 A | 2/1989 | Hansen, III et al. | |
| 4,860,782 A | 8/1989 | Fujiwara et al. | |
| 5,031,068 A | 7/1991 | Hansen, III et al. | |
| 5,050,635 A | 9/1991 | Tetsila et al. | |
| 5,438,730 A | 8/1995 | Hansen, III | |
| 6,045,848 A | 4/2000 | Quiniones et al. | |
| 6,240,948 B1 | 6/2001 | Hansen, III et al. | |
| 6,244,561 B1 | 6/2001 | Hansen, III et al. | |
| 6,460,567 B1 | 10/2002 | Hansen, III et al. | |
| 2002/0104564 A1 | 8/2002 | Dulac | |
| 2003/0020041 A1 | 1/2003 | Nearpass | |
| 2003/0079782 A1 | 5/2003 | May | |

FOREIGN PATENT DOCUMENTS

WO     2007145698 A3     12/2007

* cited by examiner

*Primary Examiner*—Kevin L Lee
(74) *Attorney, Agent, or Firm*—Robert J. Clark

(57) ABSTRACT

A universal valve for refrigeration systems including an investment-cast, stainless-steel valve body, a piston and one of a plurality of an anodized aluminum adapter plates. Each adapter plate configured to be removed and replaced with another to operate the valve to perform a different function. The investment-cast, stainless steel valve body includes an inlet and an outlet which each include a flangeless distal end configured, as cast, with an unmachined, weldable rim for integration without mechanical connections in a leak-free configuration.

40 Claims, 28 Drawing Sheets

• = LOCATION OF SINGLE OR MULTIPLE VALVE SECTION

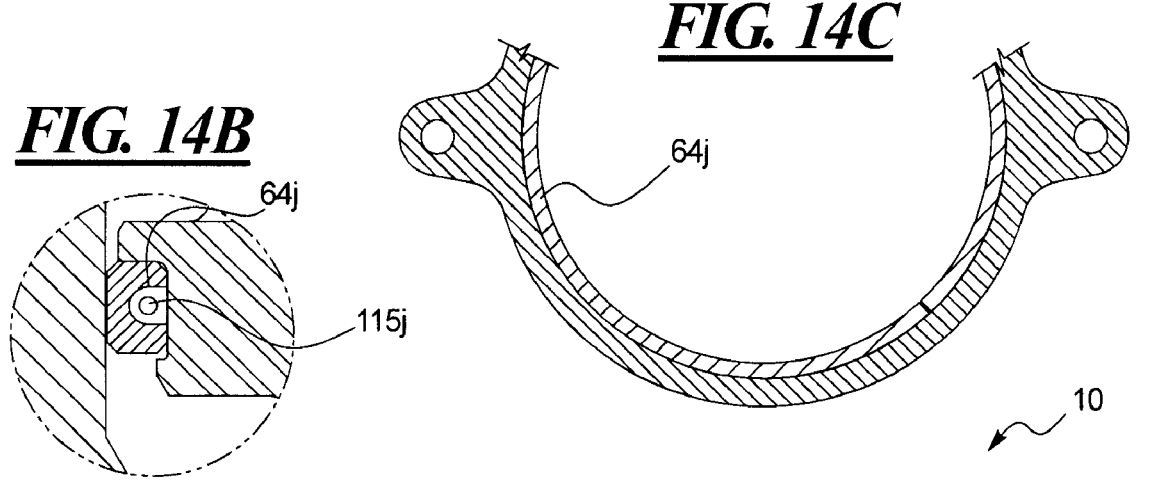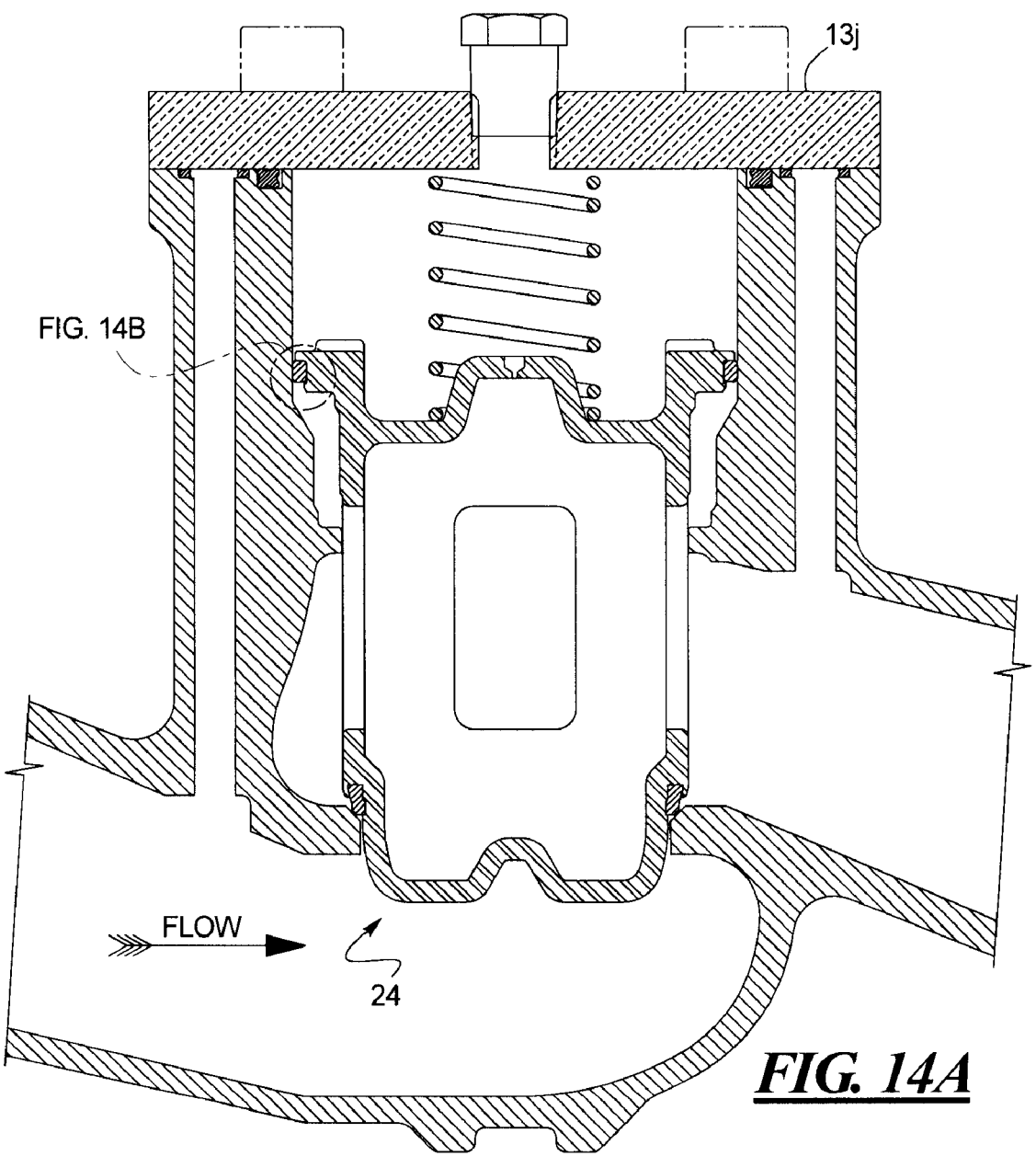

UNIVERSAL REFRIGERATION VALVE

BACKGROUND

The present disclosure generally relates to refrigeration valves, and more particularly, to an improved refrigeration valve having a universal main body, preferably formed from investment-cast, stainless-steel or other suitable material, that may be used in connection with any number of adapter plates that have been configured to operate the valve to accomplish any function in a commercial or industrial refrigeration system. The adapter plates are preferably formed from an easily machined and drilled, lightweight material, such as aluminum, and anodized to prevent corrosion, or any other suitable material. The improved valve has an inlet and an outlet, each with a flangeless distal end configured, as cast or formed, with an unmachined, weldable rim for integration into the commercial or industrial refrigeration system without mechanical connections in a leak-free configuration.

Closed cycle refrigeration systems have been in use for approximately at least 100 years. During that time many improvements have been made to the elements of the basic system in order to achieve better efficiencies, controllability, temperature ranges, safety, lower temperatures, greater capacities, reduced weight, compactness, reliability, flexibility, and other refinements.

The simplest refrigeration systems involve a Carnot fluid cycle in a closed circuit. Usually the fluid exists as a liquid for certain temperature and pressure conditions, as a gas for other conditions, and a two-phase liquid and gas for other conditions. In a certain location, commonly referred to as an evaporator, as shown in FIG. 1, the mutually contacting liquid and gas or vapor are becoming lesser in liquid percentage and greater in gas percentage as external heat is put into the evaporator. Contrariwise, in a certain location, commonly referred to as a condenser, as shown in FIG. 1, mutually contacting liquid and vapor are becoming greater in liquid percentage and lesser in vapor percentage as heat is removed from the condenser.

In the fluid circuit or conduit between the evaporator and the condenser a mechanical gas compressor or other suitable mechanism, device or apparatus is employed to move the vapor from the lower temperature and pressure of the evaporator to the higher temperature and pressure of the condenser. To control the fluid flow in this closed circuit, a device, commonly referred to as an expansive valve, is used to expand or feed the liquid from the high pressure and temperature condenser to the low pressure and temperature evaporator. For example, FIG. 1 is a simple diagram that illustrates a basic elementary cycle.

Closed-cycle refrigeration systems for use in commercial and industrial applications are typically much more complex than the basic system shown in FIG. 1, involving multiple evaporators, condensers, compressors, expanders, and subsidiary cycles and circuits for multiple temperature levels, for capacity control, for defrosting, for temporary unusual conditions, or for multiple other purposes. For example, FIG. 2 is a diagram that illustrates a typical commercial or industrial system wherein each solid dot indicates the location for installation of at least one control valve.

It will be recognized by those of skill in the art that the most common industrial refrigeration fluid is ammonia, commonly identified by the chemical compound notation NH3. The pressure temperature saturation curve for ammonia is in a range suitable for industrial refrigeration of foodstuffs, beverages, and other cooling processes, generally in the range of +50° F. to −50° F. or thereabouts. The pressures and densities of the liquid and vapor phases of a refrigeration fluid that are within the above-mentioned operational envelope are reasonably compatible with mechanical pipes, compressors, heat exchangers, valves, and other system elements. However, ammonia (NH3) is corrosive to brass and copper, but less corrosive when dry to ferrous metals and certain other alloys. Moreover, NH3 is not only toxic to humans and other living things but it can be harmful to foods and to many other materials in the living environment. Under certain conditions certain mixtures of NH3 and air and the presence of, a hot spark can cause flaming or even explosion. In addition, the smell of ammonia can cause panic among humans and animals. Consequently, the use of ammonia in a refrigeration cycle system must be tightly and safely contained and sealed at all times during normal operation.

Those of skill in the art will also recognize that other fluids may also be used as refrigerants in similar closed cycles, including carbon dioxide, hydrocarbons, fluorocarbons, and other fluids which can exist in liquid or gaseous phases. Such systems must also be sealed against any possibility of leakage from the system to the atmosphere or from the atmosphere to the system for similar reasons. Leakage in either case could cause the system to become inoperative or even dangerous. Consequently, integrity of the system against leakage is of utmost importance and must exist at all anticipated system pressures, temperatures, vibrations, corrosive attacks, or even user misuse.

To overcome the vast temperature, pressure and corrosion demands, conventional commercial and industrial refrigeration valves have thick, oversized-walls which result in a very heavy weight. Such conventional valves are also specialized in design such that they are often unique as per each installation location in the refrigeration system and as a result usually include specialized connections such as flanges for the installation thereof. Still further, conventional valves, are made of common ferrous materials, such as iron, steel or the like, and must be painted or otherwise coated to prevent rust and other degradation.

Refrigeration systems are uniquely different from all other common industrial closed and open fluid circuits including, without limitation hydraulic systems, steam systems, sanitary sewage systems, potable water systems, and many other simple and complicated fluid systems. For such non-refrigeration systems, components exist which can operate satisfactorily for the particular fluids, pressures, temperatures, flow rates, and other unique characteristics. In rare circumstances, certain standardized components might be used in some locations of certain refrigeration systems. Generally, those of skill in the art will acknowledge that those rare circumstances are quite exceptional and that one of skill in the art would recognize that such standardized components are not satisfactory in refrigeration systems due to unsuitable materials, pressure or temperature capability, slight leakage, or other deficiencies.

Specifically, for the valve installation locations shown in the typical commercial or industrial refrigeration piping system shown in FIG. 2, some of the deficiencies would include, without limitation, the following: improper mating connections to system piping, inadequate corrosion resistance, excessive valve weight requiring additional support for the valve and is connecting piping, improper seals to connect the valve parts together, wrong clearances for sliding parts, improper seal designs, excessively high or low working pressure capability, incorrect function of the valve in a refrigeration system, and other characteristics making such standardized components (i.e., special purpose valves or general purpose valves) unsuitable for refrigeration systems. For the above reasons, an entirely unique population of valves exist that have been and must be designed and constructed for all of the unique elements of the many designs of refrigeration systems using a multitude of fluids as circulating cycle refrigerants for different versions of the Carnot vapor cycle.

Therefore, there exists a need in the art for a universal refrigeration valve that overcomes the disadvantages of conventional valves, may be integrated into a refrigeration system without mechanical connections or machining of the inlet or outlet of the valve, interfaces with a plurality of adapter plates to perform any number of different functions, requires very few machining steps after forming or casting, will be inexpensive to manufacture, is formed or casted to very tight tolerances, has a long life without the need to internally service and other advantageous features.

SUMMARY

In accordance with one principal aspect of the present disclosure, a valve for a refrigeration system includes an investment-cast, stainless-steel valve body and piston and an adapter plate. The adapter plate is removably connected to the valve body. The piston facilitates flow control of a refrigeration fluid. The valve body includes a main body, an inlet and an outlet. The main body includes pressure ports that provide operative communication between the adapter plate and the inlet and outlet respectively; so that the adapter plate may function to control movement of the piston with respect to a main valve port. The inlet and outlet each include a respective flangeless distal end configured, as cast, with an unmachined, weldable rim for integration without mechanical connections in a leak-free configuration.

In another, principal aspect of the present disclosure, a universal valve for refrigeration systems including an investment-cast, stainless-steel valve body, a piston and one of a plurality of adapter plates. Each adapter plate configured to be removed and replaced with another to operate the valve to perform a different function. The valve body includes an inlet and an outlet which each include a flangeless distal end configured, as cast, with an unmachined, weldable rim for integration without mechanical connections in a leak-free configuration.

In still another principal aspect of the present disclosure, a valve for a refrigeration system includes a valve body and adapter plate configured to function to control operation of the valve body. The adapter plate is removably connected to the valve body and further includes a pilot solenoid valve plunger to control flow of a refrigeration fluid from the valve body through an outlet. The pilot solenoid valve plunger includes an armature and a plug having a conical end connected thereto, a mounting end having a bore defined by an internal surface and an external surface with an annular rib and a ball seated within the bore to secure the seat plug to the armature such that the conical that is selectively contiguous with a seat orifice. The valve body includes an inlet and an outlet that each include a respective flangeless distal end configured, as cast, with an unmachined, weldable rim for integration without mechanical connections in a leak-free configuration.

In yet another principal aspect of the present disclosure, a valve for a refrigeration system includes a valve body and a adapter plate configured to function to control operation of the valve body. The adapter plate is removably connected to the valve body and includes an investment-cast, stainless-steel pilot regulator bonnet having a longitudinal groove cast therein configured to engage a pin connected to a spring follower to prevent rotation of the spring follower during movement thereof.

In still yet another principal aspect of the present disclosure, a valve for a refrigeration system includes a valve body and a piston. The valve body includes a main body that has a valve body bore and a flow chamber separated by a web projecting from the valve body bore to define a distal end. The piston includes an upper seal configured to engage the valve body bore, a lower seal configured to selectively engage a main valve port adjacent the flow chamber to facilitate flow control of a refrigeration fluid and a skirt section disposed between the upper seal and the lower seal. The distal end restricts lateral movement of the piston as the piston is moved to selectively engage the main valve port so that the lower seal engages the main valve port concentrically to stop the flow of the refrigeration fluid.

In another further principal aspect of the present disclosure, a valve for a refrigeration system includes a valve body, an investment-cast, stainless steel piston and an anodized aluminum adapter plate. The valve body includes a main body, an inlet and an outlet. The anodized aluminum adapter plate includes a planar bottom surface and a plurality of openings formed in the bottom surface for communication with the main body when the anodized aluminum adapter plate is removably connected to the valve body. The investment-cast, stainless steel piston includes an upper seal configured to engage a main body bore defined in the valve body and a lower seal configured to engage a main valve port which facilitates flow control of a refrigeration fluid. The main body includes the main body bore generally centrally located, an inlet pressure port and an outlet pressure port. The inlet pressure port provides operative communication between the inlet and the anodized aluminum adapter plate and the outlet pressure port provides operative communication between the anodized aluminum adapter plate and the outlet; so that the anodized aluminum adapter plate functions to control movement of the investment-cast, stainless steel piston with respect to the main valve port. The inlet and outlet each include a respective flangeless distal end configured, as cast, with an unmachined, weldable rim for integration without mechanical connections in a leak-free configuration.

In still another further principal aspect of the present disclosure, a valve for integration into a refrigeration system includes a valve body comprising a main body, an inlet and an outlet. One of the inlet and the outlet includes a flangeless distal end configured with an unmachined weldable rim. A first pipe having a first outer diameter abuts the rim for connection without mechanical connection in a leak-free configuration. Another of the inlet and the outlet includes a plurality of projections extending from an inner surface thereof to cooperatively define a stop. A second pipe having a second outer diameter is transition fit within the another of the inlet and the outlet for connection without mechanical connection in a leak-free configuration.

BRIEF DESCRIPTION OF THE DRAWINGS

Certain embodiments are shown in the drawings. However, it is understood that the present disclosure is not limited to the arrangements and instrumentality shown in the attached drawings.

FIG. 14A is a vertical sectional view of another valve embodiment according to the present disclosure and FIGS. 14B and C are detailed views thereof.

DESCRIPTION OF THE PREFERRED EMBODIMENTS

Figure 1:
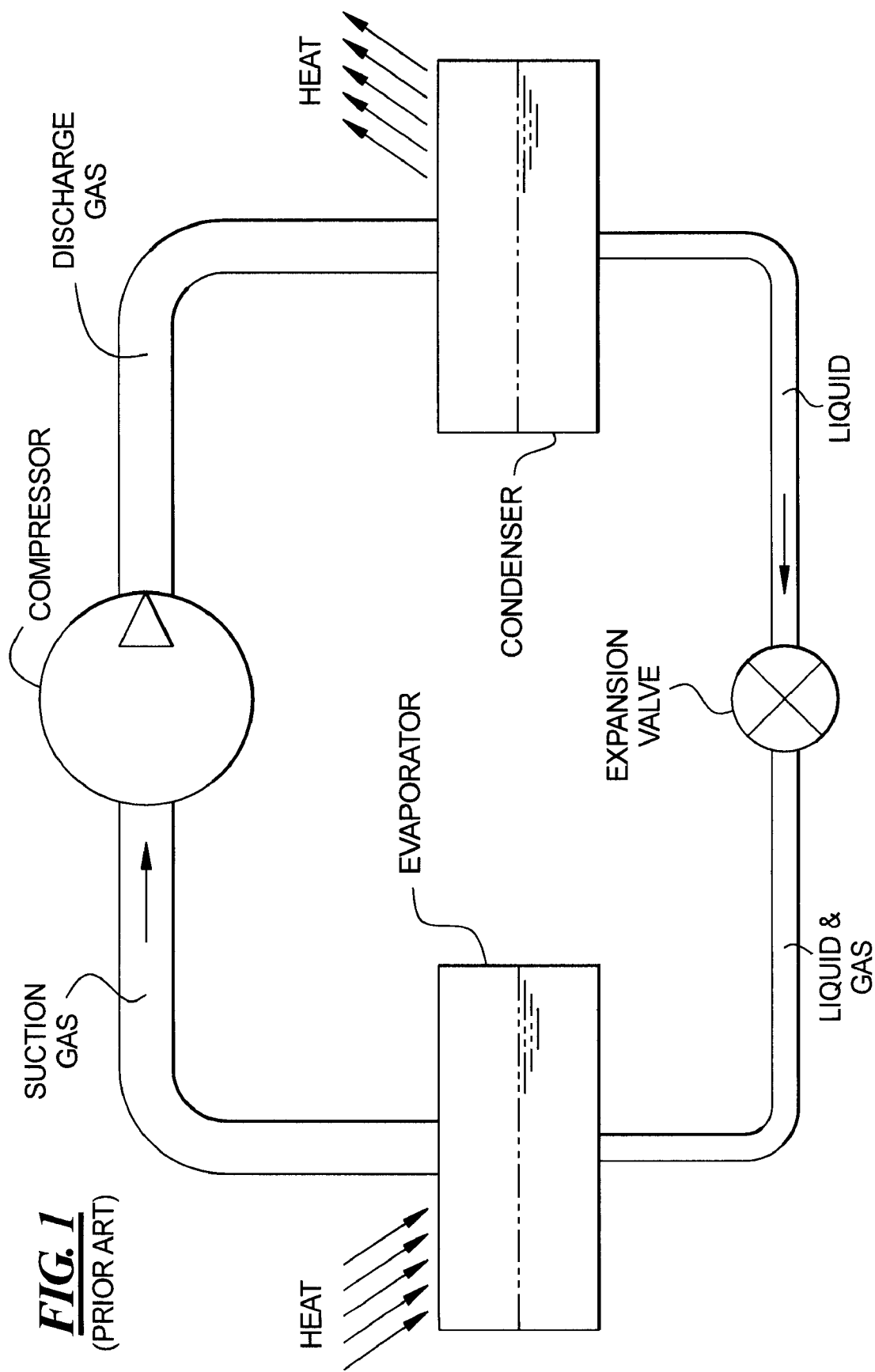
FIG. 1 is a schematic representation illustrating a basic refrigeration cycle.
Figure 2:
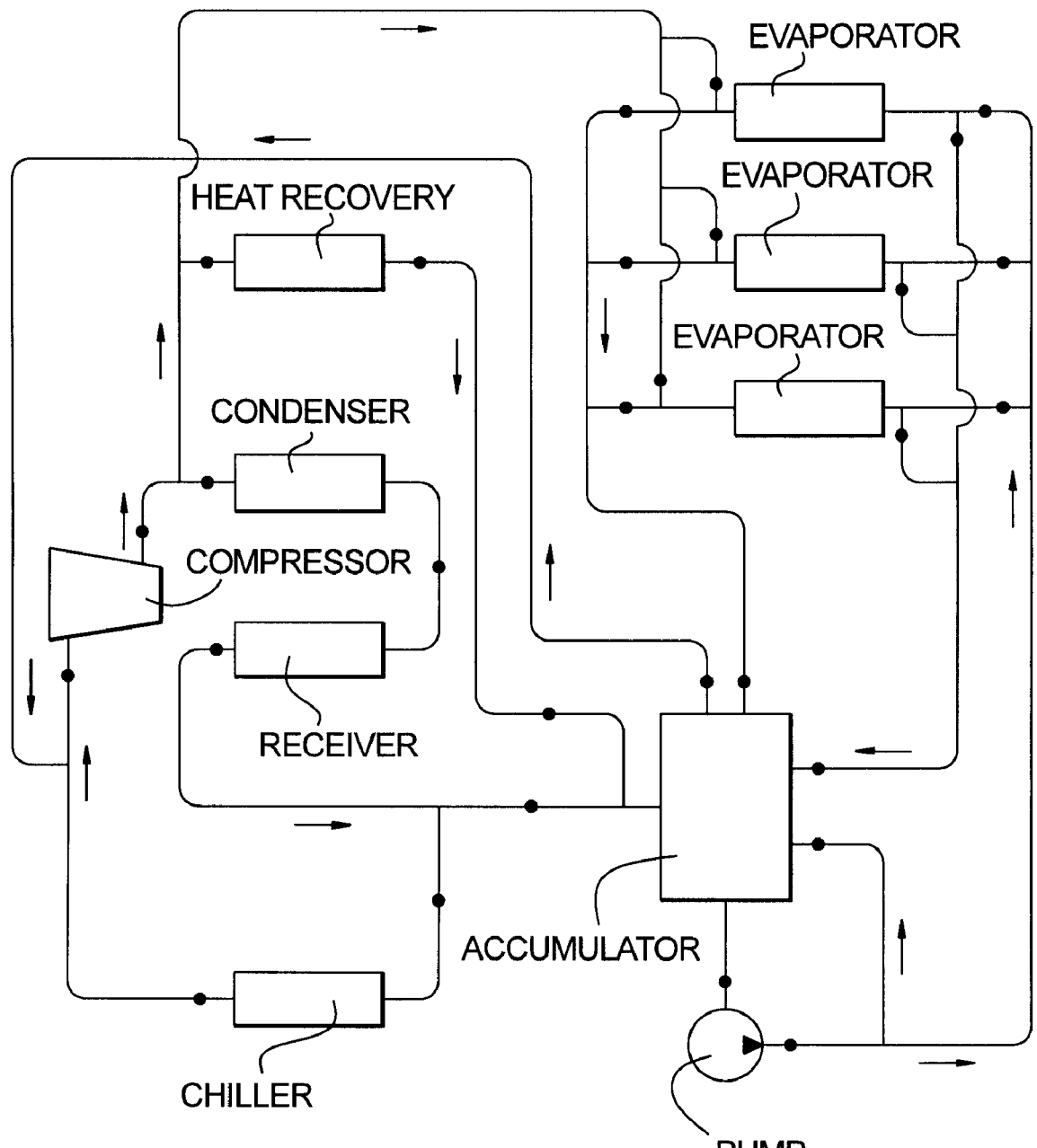
FIG. 2 is a schematic representation illustrating a typical commercial or industrial refrigeration system.

For the purposes of promoting and understanding the principles disclosed herein, reference will now be made to the preferred embodiments illustrated in the drawings and specific language will be used to describe the same. It will nevertheless be understood that no limitation of the scope is thereby intended. Such alterations and further modifications in the illustrated devices and such further applications of the principles disclosed as illustrated herein as being contemplated as would normally occur to one skilled in the art to which this disclosure relates.

Figure 3:
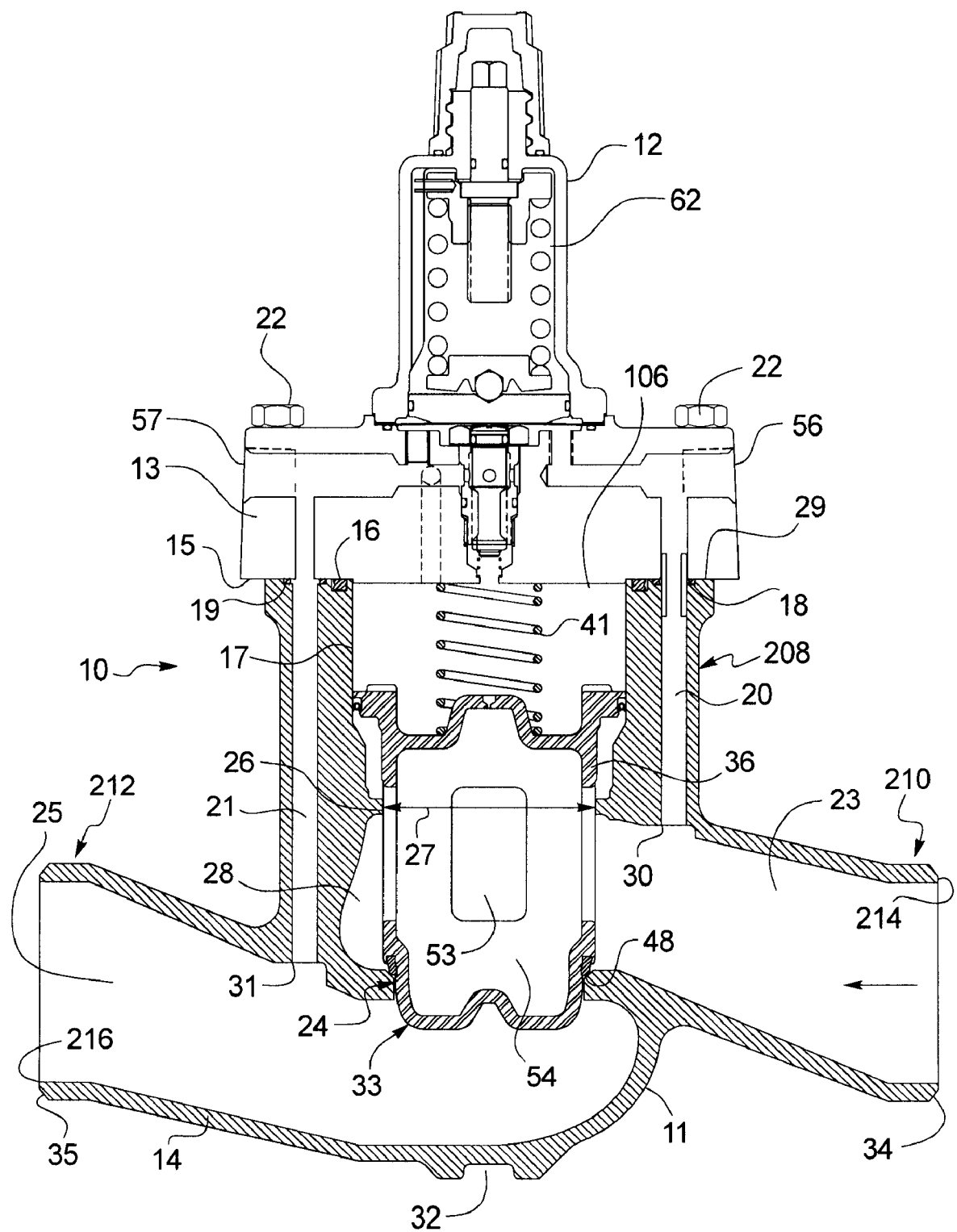
FIG. 3 is a vertical sectional view of a valve according to one embodiment of the present disclosure.
Figure 4A:
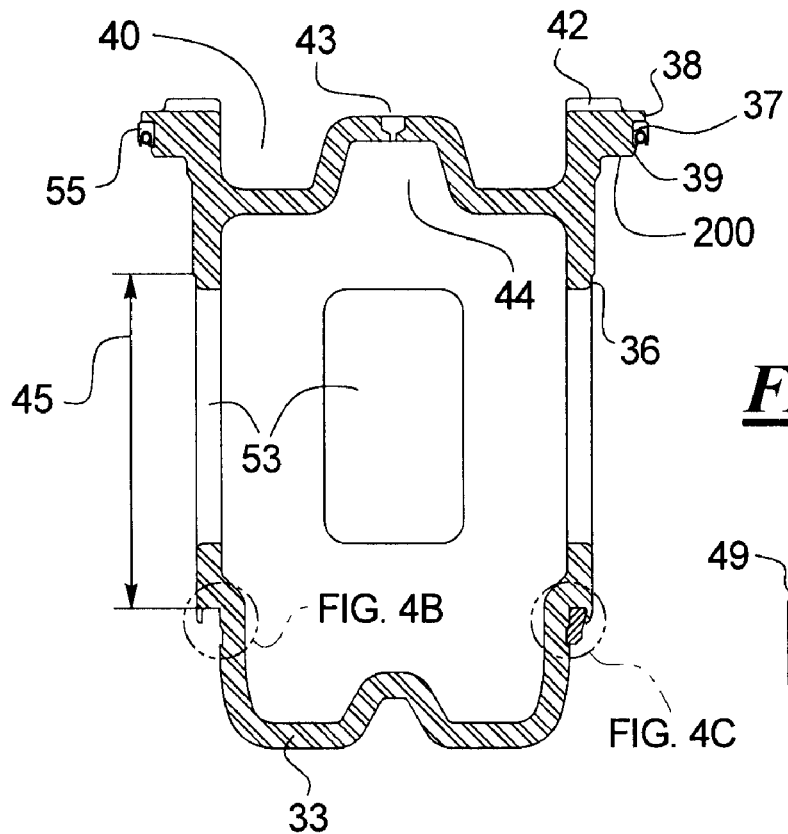
FIG. 4A is a vertical sectional view of a piston used in the valve of FIG. 3 and FIGS. 4B-D are detailed views thereof.
Figure 4D:
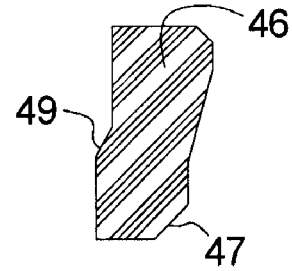
Figure 4B:
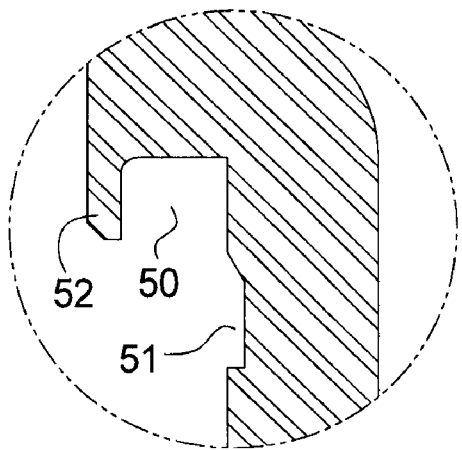
Figure 4C:
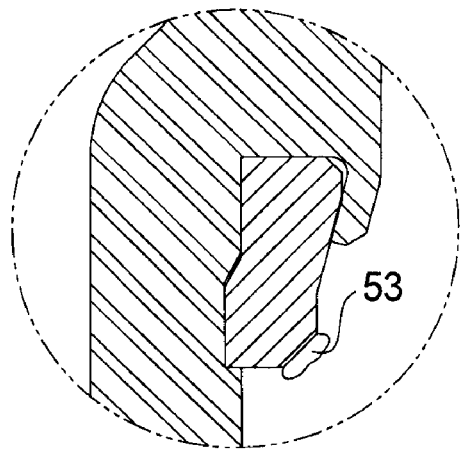

Referring now to FIG. 3, a vertical sectional view of one embodiment of a refrigeration valve assembly in accordance with at least one of the principal aspects of the present disclosure is designated 10. The assembly 10 can operate in conjunction with various top-fitted covers or adapter plates 13. The valve body 11, in one preferred embodiment, may be formed as an investment casting from any suitable alloy, such as, for example, in one embodiment, 304L stainless steel or any other suitable material which can be welded, soldered, brazed or otherwise connected without flanges to existing structure of refrigeration system. Another embodiment may include materials that facilitate connection to steel or stainless steel pipe, brazed to copper or brass pipes or any other suitable material present in existing refrigeration systems. It is within the teachings of the present disclosure that the valve body may also be formed from permanent-molded, epoxy-coated machined steel, zinc-plated machined steel or any other like or suitable material.

Investment casting technology provides unexpected results in the design, structure and function of refrigeration valves. In particular, one unexpected result is the structural configuration of the valve body 11 in all embodiments may be optimized in shape, contour and wall thickness 14 by using finite element analysis in view of operating parameters, such as, but not limited to a maximum internal body pressure of 3000 psi which insures a safety factor of 5 for a working pressure of 600 psi which is acceptable for ammonia, R-22, and other acceptable refrigeration fluids, and actually be faithfully reproduced with investment casting. The consequence is an unexpected result and aspect of the present disclosure that is particularly advantageous over conventional designs and configurations because for a given flow capacity and port size of the valve of the present disclosure is approximately 40% or less than the weight of a conventional similar size and function valve, which is typically made of iron and steel.

In the embodiment wherein the valve body is made from investment-cast, stainless steel, the wall thickness can be much thinner and therefore much lighter than conventional designs or configurations because of the high tensile strength of 304L or equivalent stainless steel, the absence of any need for extra wall thickness to account for future corrosion, the optimization of wall thickness for equivalent internal total pressure capability and investment casting which reduces variations in wall thickness as compared to conventional iron or steel foundry molding process. As a result, the valve of the present disclosure has an equivalent strength and is much lighter than conventional designs.

In addition, most similar functioning valves utilize associated covers, bonnets, or adapters made of iron or steel, whereas the valve of the present disclosure, compared to iron, may use aluminum which is approximately 60% or more lighter in weight or plastic which is approximately 75% or more lighter in weight. Furthermore, being welded or soldered directly into the existing structural pipeline, the valve of the present disclosure avoids the need of heavy flanges on the valve body or any companion flanges attached to the existing structural piping. Consequently, a refrigeration valve in accordance with the present disclosure unexpectedly results in a considerably lighter, easier to handle, adaptable and functional valve.

The adapter plate 13 may be cast, forged, or otherwise formed from aluminum, plastic, or any other suitable light alloy that may be fabricated for multiple pilot control functions. For example, it is within the teachings of the present disclosure that the adapter plate 13 may be formed from anodized aluminum, zinc-plated ductile cast iron, high-strength plastic, or any other like or suitable material. The high-strength plastic may be formed from polysulfone blends, polyphenylsulfone, polyethersulfone, polymides, polyamideimide or any other like or suitable material. The adapter plate 13 preferably has a flat, smooth, bottom surface that provides a seal against a neoprene O-ring 16 surrounding the valve body bore 17, and O-rings 18 and 19, which surround the inlet pressure port 20 and the outlet pressure port 21, respectively. Cap screws 22 are threaded into valve body 11 to maintain tight contact and engagement between adapter plate 13 and valve body 11 and thereby squeeze O-rings 16, 18, and 19 into a sealing condition against pressures ranging from about 0.1 PSIG to 3000 PSIG.

The valve body 11 encloses a main body 208, an inlet or upper entrance chamber 23 which communicates with the upper portion of main valve port 24 and an outlet or lower chamber 25 which communicates with the lower portion of main valve port 24. The valve body bore 17 is formed in the main body 208 preferably as a smooth, cylindrical surface machined to a tolerance of plus 0.001 inches and minus zero and a surface finish of approximately between 16 and 32 rms. At a lower end of the valve body bore 17 is a diametrically smaller generally annular cylindrical web 26 projecting into such bore 17 to separate the bore 17 from the flow chamber 28 and to define a distal end that is configured generally annular with a diameter 27 and is machined to preferably have a surface finish of approximately between approximately 16 and 32 rms and a tolerance of plus 0.001 inches and minus zero. Below the web 26 is a flow chamber 28 which defines a flow area larger than that of main valve port 24.

Inlet pressure port 20 and outlet pressure port 21 are preferably vertical drilled holes from main body 208 top surface to inlet or upper entrance chamber 23 and outlet or lower chamber 25 respectively. To facilitate accurate vertical drill movement, the cast surface in upper entrance chamber 23 at the lower extremity of inlet pressure port 20 on interior depression 30 is parallel to body top surface 29. This facilitates breakthrough of the downward moving drill point without sideways forces which could break the drill which is under great stress because of the large ratio of drilling depth to drilling diameter. The same configuration exists for outlet interior depression 31 at the bottom of outlet pressure port 21.

Valve body 11 may also include a cylindrical depression 32 located along the vertical axis of the valve body bore 17 for the installation of a weld-in vertical gland assembly which can be utilized via a vertical screw thread to push upward to an open position of piston 33.

Figure 29A:
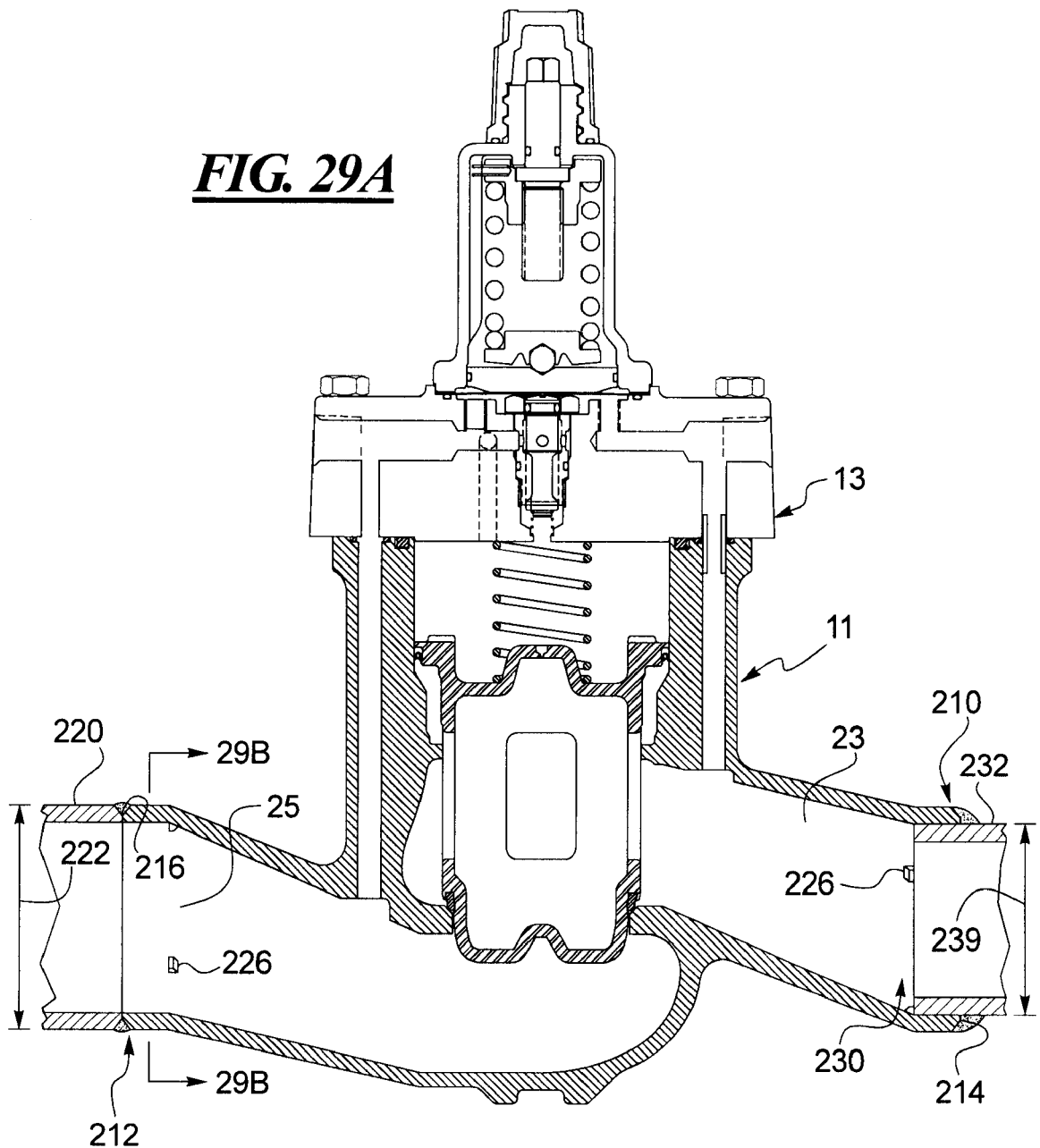
FIG. 29A is a vertical sectional view of another valve embodiment according to the present disclosure and FIG. 29B is cross sectional view of FIG. 29A taken along line 29B-29B.

Each of the inlet 23 and outlet 25 preferably include a flangeless distal end 210 and 212, respectively, configured, as cast or formed, with an unmachined, weldable rim 214 and 216, respectively, for integration into a refrigeration system without mechanical connections in a leak-free configuration. Each rim 214, 216 preferably may be designed to be cast or formed in a standard refrigeration pipe size and dimension and preferably have a beveled outside diameter surface 34, 35 suitable for proper butt welding, socket welding or other preferable connection without mechanical connection in a leak-free configuration to existing refrigeration system structure as shown in FIG. 29A and described below. Likewise, the inner diameter of the connection ends 34 and 35 are configured to transition fit or engage a standard refrigeration pipe sized and dimensioned an adjacent step size from the standard refrigeration pipe suitable for butt welding. For example, the first outer diameter may be nominally 3 inches with an actual diameter of 3.125 inches and adjacent step size for standard refrigeration piping may have an outer diameter of nominally 2.5 inches with an actual diameter of 2.625 inches. As a result, the inner diameter of the connection ends 34 and 35 would be configured to transition fit with respect to a dimension of 2.625 inches as shown in FIG. 29A. It will be recognized by those of skill in the art that other adjacent step sizes may be incorporated into the valve, as desired or necessary, without departing from this disclosure. The transition fit pipe may be socket welded in accordance with conventional standards. The accuracy of investment casting renders machining of these connecting ends unnecessary which is a significant advantage over any prior art.

Piston 33 may be an investment casting preferably of stainless steel or any other suitable material as discussed above with respect to the valve body. The interior 34 is hollowed-out preferably by means of a conventional investment casting core which is supported by four piston windows 53 through the piston walls 36 which can be relatively thin and uniform because of the precision support of the four windows 53 of the supported core of the casting.

Referring now to FIGS. 4A-D, which shows the piston 33 in greater detail, it is noted that piston 33 may have a commercial-type spring energized pressure seal 55 which is facing downward to prevent gas pressure flow upward around the piston. A groove 37 in the piston 33 accommodates the upper seal 55. A longer lip 38 prevents the upper seal 55 from being forced upward from the groove under high-pressure differences across seal 55. Since the pressure is usually not higher above seal 55 than below, a shorter lip 39 can be used at the bottom of the groove 37. This smaller lip 39 permits the seal 55 to be installed upward around piston 33 without damage to the seal 55 which is intolerant of excess stretching.

Figure 19:
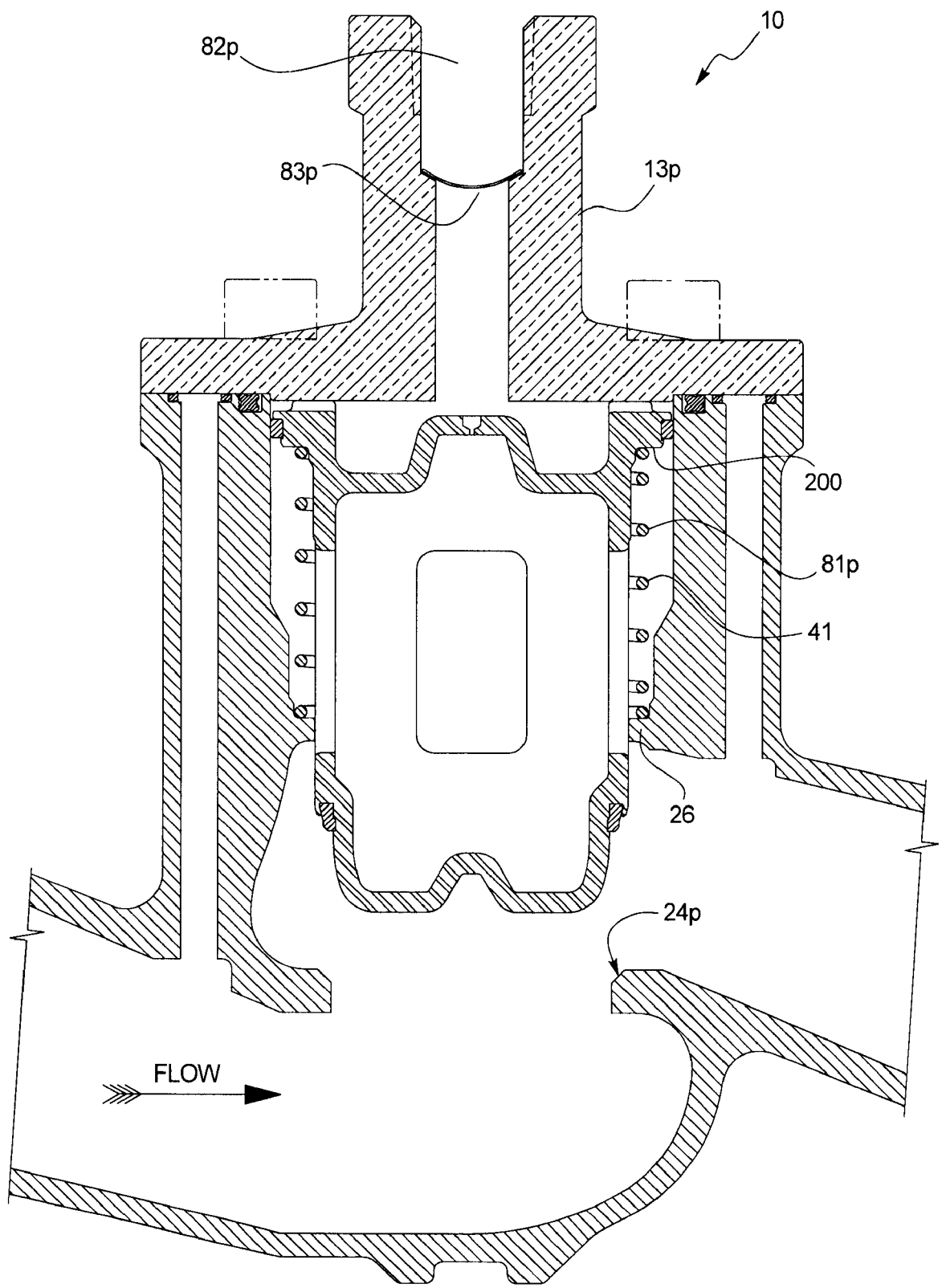
FIG. 19 is a vertical sectional view of another valve embodiment according to the present disclosure.

The upper portion of the piston 33 has a depressed annular ring section 40, in one embodiment, which guides and accommodates a biasing element 41, in this embodiment, a coil spring when the biasing element is disposed between the adapter plate and the piston 33 to normally bias the piston away from the adapter plate 13. It is within the teachings of the present disclosure that any other suitable biasing element may be used in substitution therefore to accomplish the same function. For example, any other like or suitable spring or other suitable biasing element. Moreover, in another embodiment, as shown in FIG. 19, the biasing element 41 may be disposed between the web 26 and the piston 33 to normally bias the piston 33 away from the web 26, as will be described with respect to operation below.

To facilitate biasing of the piston 33 normally open, a shoulder 200 is defined on the piston 33 adjacent the upper seal 55. Other like or similar structure on the piston 33 to perform such function is within the teachings of this disclosure. Four projecting lugs 42 are cast into the top of the piston to prevent any trapped oil from causing the piston to stick by oil cohesion to the smooth lower surface 15 of the adapter plate 13.

The upper part of piston 33 has a bleed hole 43 (approximately 0.030" diameter in one embodiment) at the top of gas dome section 44 at the interior top of the piston 33. The piston 33 preferably has a machined cylindrical skirt section 45 which is clearance fit with respect to and centered by the distal end of web 26 whose diameter may be approximately between approximately 0.001 and 0.003 inches larger than skirt section 45 or any other acceptable clearance to define a diametrical clearance between the skirt portion and the distal end. The clearance preferably permits intermittent sliding engagement between the skirt portion and the distal end such that the lower seal 46 is repeatedly substantially concentrically aligned with the main valve port 24 during movement of the piston. Moreover, the skirt portion is preferably concentric with the upper and lower seals 55, 46 and preferably has a surface finish approximately between approximately 16 and 32 rms.

The lower part of piston 33 has a secured lower seal ring 46 which has a machined beveled surface 47 which seals against a mating beveled surface 48 in the main port 24 of the valve body 32. The seal ring 46 may have a keyed protrusion 49 which holds it in the seat retainer groove 50 which has a keyed undercut 51 which receives the mating keyed protrusion 49. The seal ring 46 is preferably machined from virgin polytetrafluoroethylene or equivalent material having, preferably having in one embodiment, at least some concentration of polytetrafluoroethylene, in a diameter about 5% smaller in diameter than retainer groove 50 and may be made from any other suitable material. In one embodiment, the seal ring 46 may be heated to approximately 250° F. before pushing it into retainer groove 50 while the piston 33 is also heated to a like temperature. The seat lip 52 (after cool down of the assembly) is press-formed to an angle of about 5° closed to firmly retain seal ring 46 into retainer groove 50. A layer of insulating grease 53 may be applied to the seating surface of seal ring 46 to protect it from excessive heat damage when the valve body 11 is being welded into the system piping.

The remaining embodiments of the present disclosure substantially incorporate the structure and function of the embodiments described in FIGS. 3 and 4. To the extent such remaining embodiments differ, the details thereof will be set forth below. Otherwise, like structure and function will not be repeated for the sake of brevity. The use of lower case letters as a suffix to aforesaid element numbers does not generally identify a new element. Rather, such suffixes are merely used in the description of different embodiments to show that such elements are substantially the same as the root element number and may be substituted therefor. Accordingly, one of skill in the art will recognize the suffixes to be a further embodiment and alternatives to aforementioned elements. Those of skill in the art will recognize how each of the following embodiments may be useful in and functional within a refrigeration system.

Figure 5:
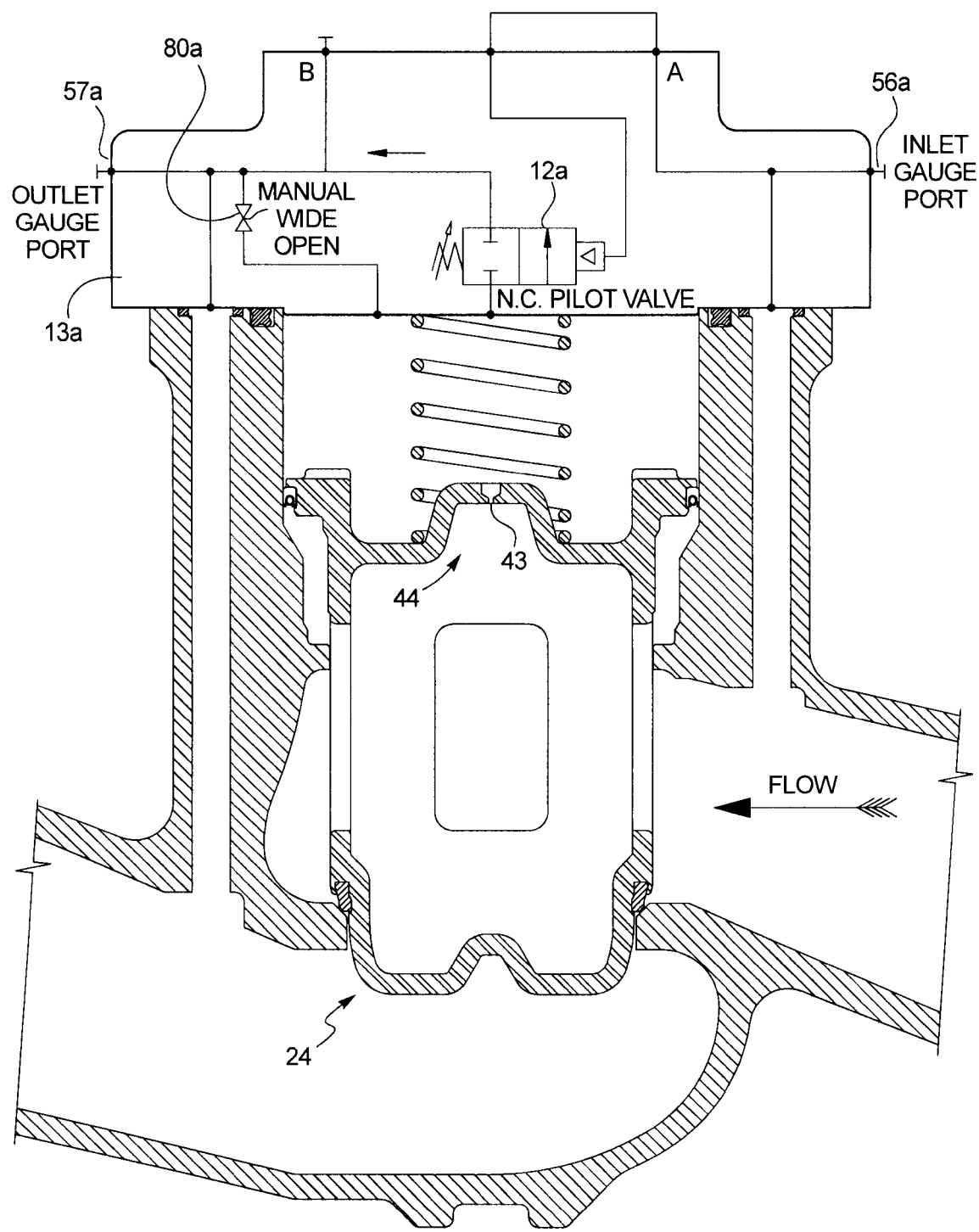
FIG. 5 is a vertical sectional view of another valve embodiment according to the present disclosure.

Referring now to FIG. 5, one embodiment of the disclosure includes an adapter plate 13a configured to cause the valve assembly 10 to function as an inlet pressure regulator by routing pilot porting holes in adapter 13a shown schematically to utilize a small inlet pressure pilot 12a. The adapter 13a has inlet pressure gage port 56a and outlet pressure gage port 57a. The pilot porting holes are routed through a manual wide opening valve 80a. This embodiment controls an inlet pressure of the refrigeration fluid by opening the main port 24 as the inlet pressure exceeds the spring setting of the normally closed built-in pilot pressure regulator 12a. This is done via the increasing flow beyond that through the bleed hole 43 from the piston top 44 to the outlet of the main regulator until the inlet pressure of the main regulator corresponds to the setting of the pilot regulator. The piston can alternatively be opened by manually opening a built-in by-pass port 80a, which reduces the pressure on top of the piston. The piston top area exceeds the main port 24 area so reducing the pressure on top of the piston overcomes the closing spring force and the piston weight. The inlet and outlet gage ports 56a, 57a are useful for pressure instrumentation.

Figure 6:
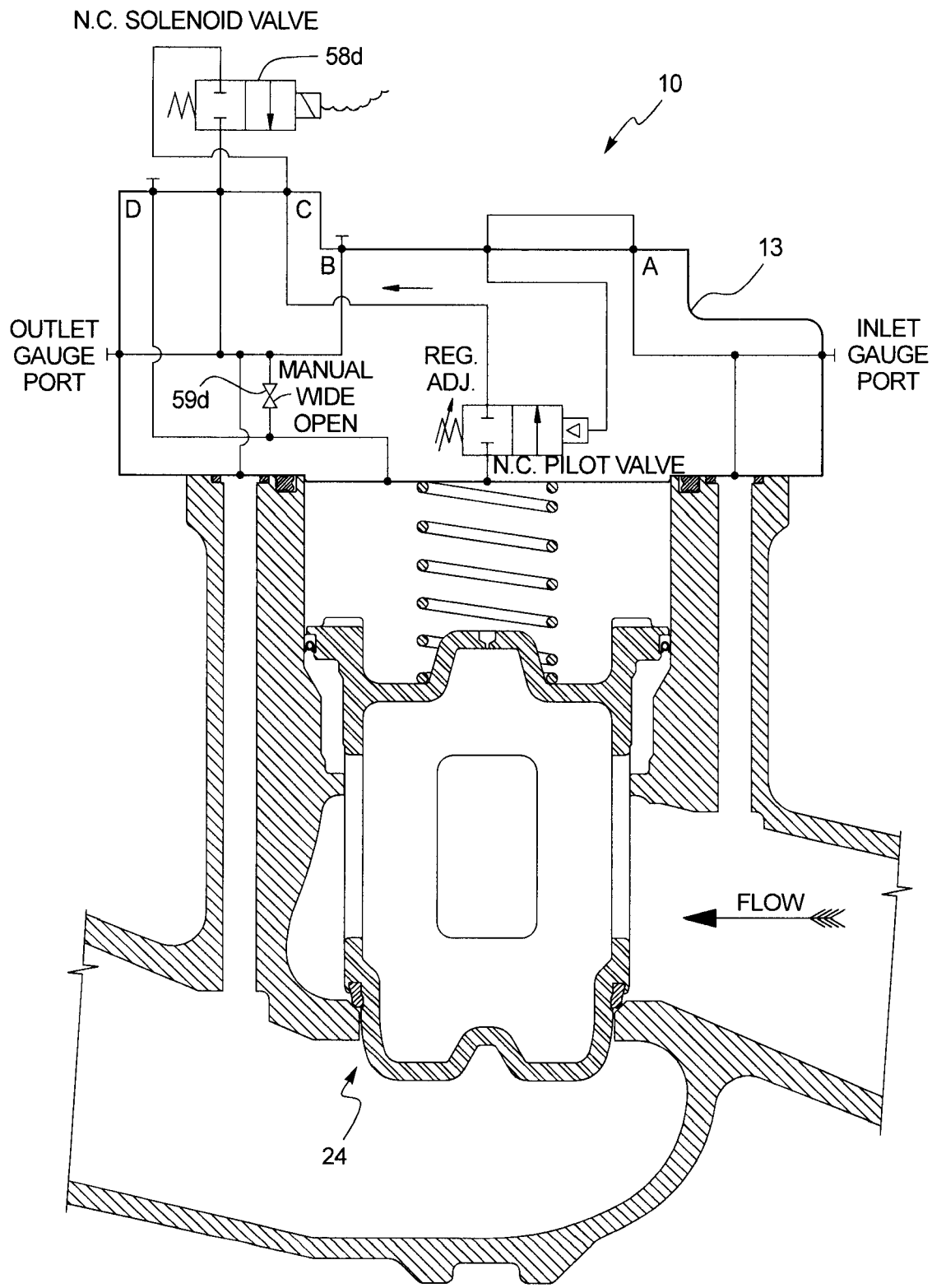
FIG. 6 is a vertical sectional view of another valve embodiment according to the present disclosure.

Referring now to FIG. 6, one embodiment of the disclosure includes an adapter plate 13 configured to cause the valve assembly 10 to function as an inlet pressure regulator (as in FIG. 5) plus routing of the pilot porting hole through shut-off solenoid valve 58d. In other words, the embodiment disclosed in this FIG. 6 fundamentally operates as described with respect to FIG. 5 plus the intervention of a normally closed built-in pilot solenoid valve 58d which, except when energized, causes the piston to remain down and the main valve seat closed. Irregardless of the pressure level, a by-pass port 59d may be provided to manually open the main port 24.

Figure 7:
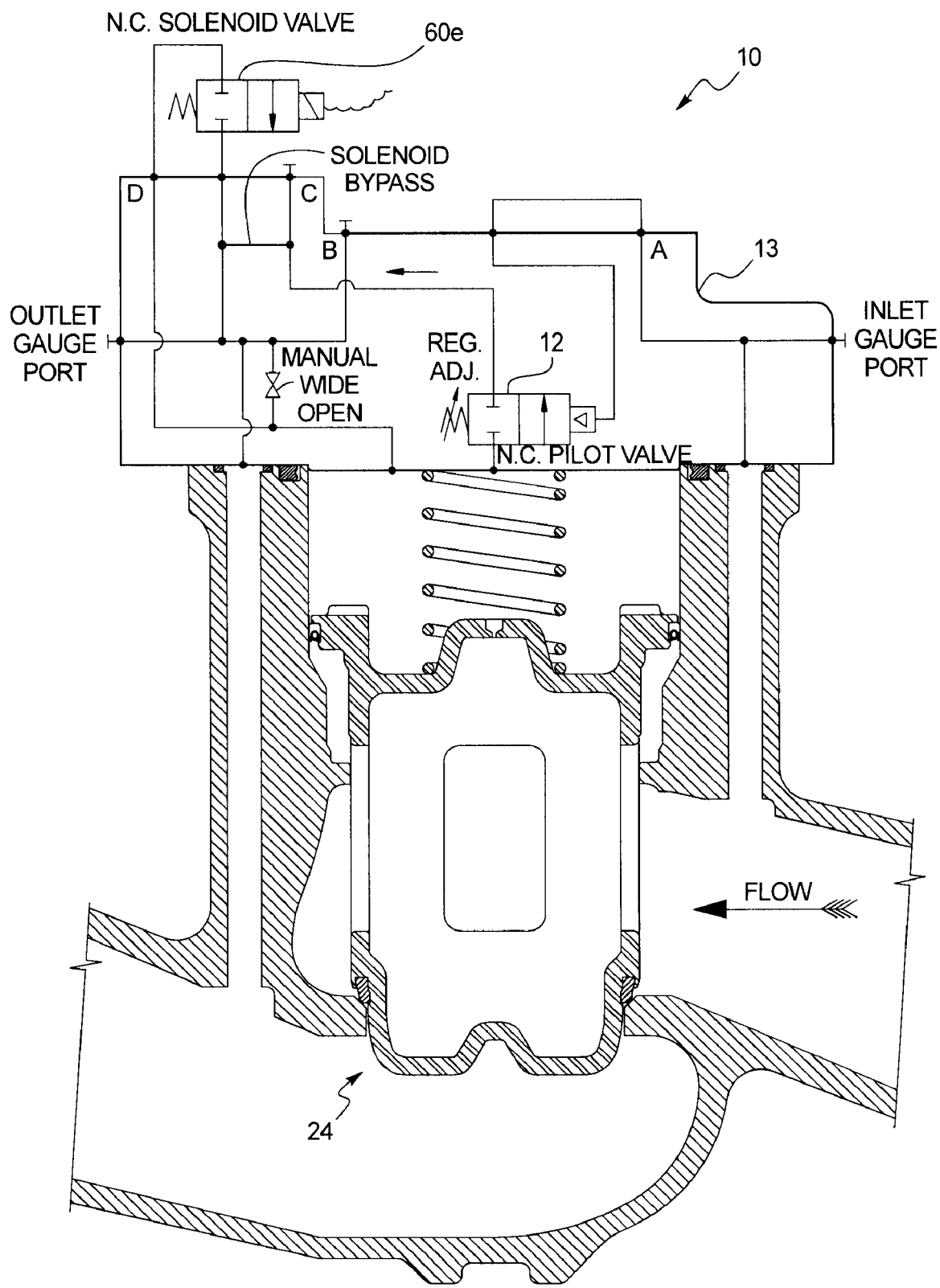
FIG. 7 is a vertical sectional view of another valve embodiment according to the present disclosure.

Referring now to FIG. 7, one embodiment of the disclosure includes an adapter plate 13 configured to cause the valve assembly 10 to function as an inlet pressure regulator (as in FIG. 5) plus routing of the pilot porting hole through wide opening pilot solenoid valve 60e. This embodiment operates like FIG. 6, except the pilot solenoid 60e, when energized to open position, permits flow from the top of the main port 24 to the main regulator outlet thereby opening the main port 24 irregardless of the inlet pressure.

Figure 8:
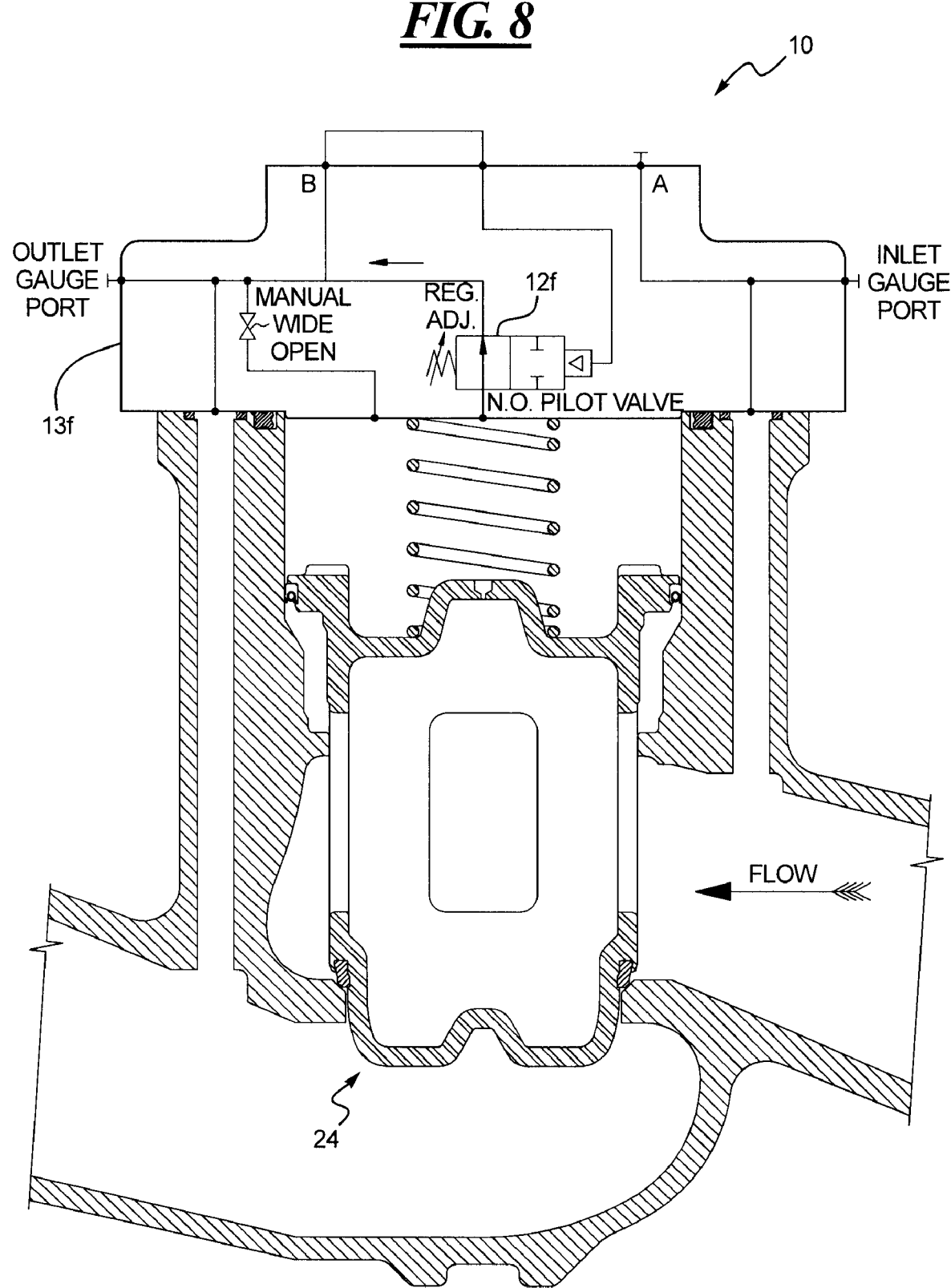
FIG. 8 is a vertical sectional view of another valve embodiment according to the present disclosure.

Referring now to FIG. 8, another embodiment of the disclosure includes an adapter plate 13 configured to cause the valve assembly 10 to function as an outlet pressure regulator which utilizes the construction of FIG. 3 by routing pilot porting holes in adapter 13f to utilize a small outlet pressure pilot 12f which closes with rising pressure. The regulator in this embodiment of the present disclosure controls outlet pressure by opening the main port 24 as the outlet pressure is below the setting of the normally open built-in pilot pressure regulator 12f. This is done by increasing flow from the top of the main port 24 as the outlet pressure is below the setting of the pilot regulator until the outlet pressure equals the pilot regulator setting.

Figure 9:
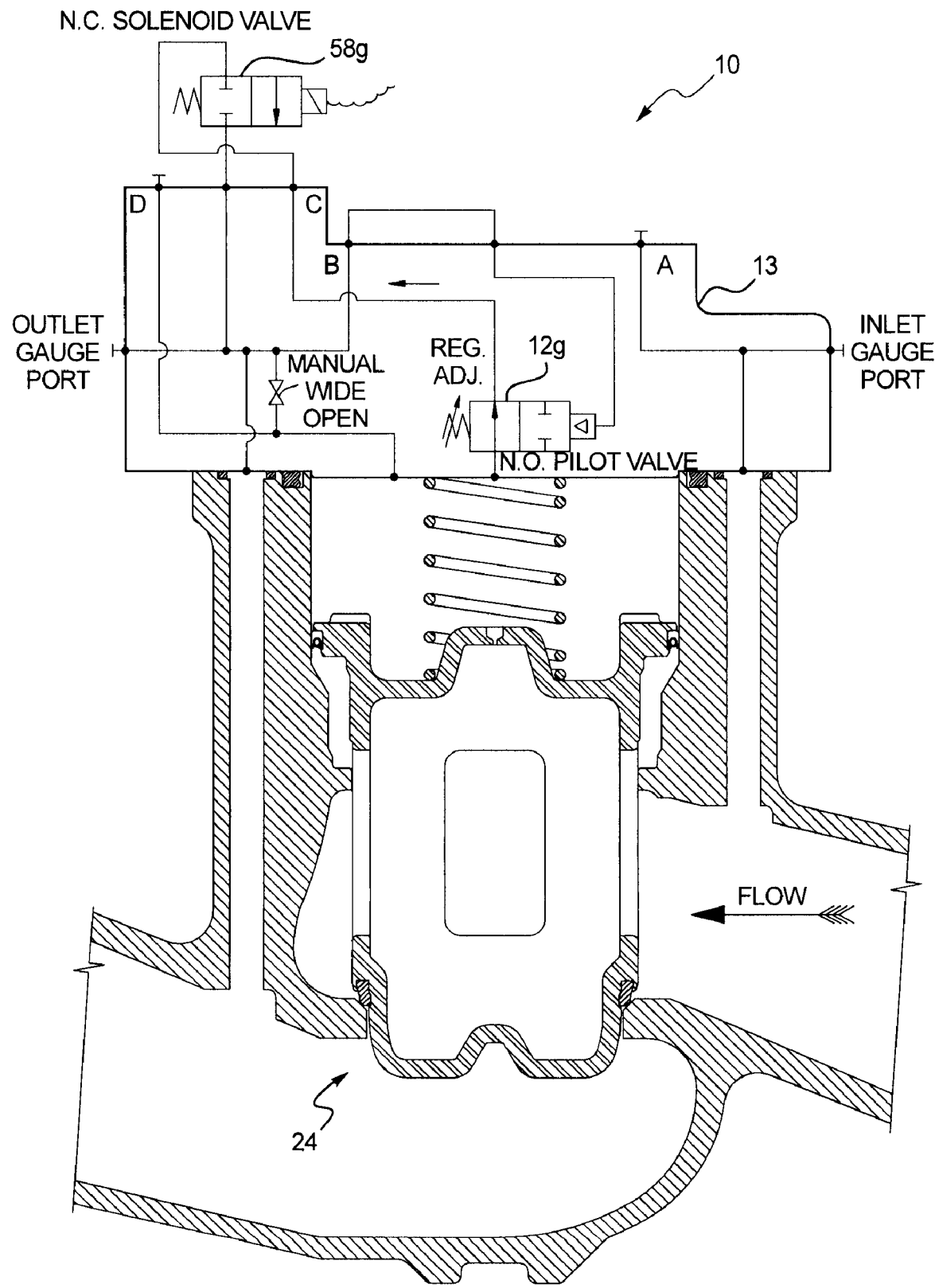
FIG. 9 is a vertical sectional view of another valve embodiment according to the present disclosure.

Referring now to FIG. 9, another embodiment of the disclosure includes an adapter plate 13 configured to cause the valve assembly 10 to function as an outlet pressure regulator as generally described in FIG. 8 but having the addition of pilot solenoid valve 58g in series with the outlet pressure pilot 12g to close the main port 24 when de-energized. This embodiment operates like FIG. 8 plus the intervention of a normally closed built-in pilot solenoid valve 58g which, unless energized, causes the main port 24 to remain closed and the main valve seat closed irregardless of the outlet pressure level.

Figure 10:
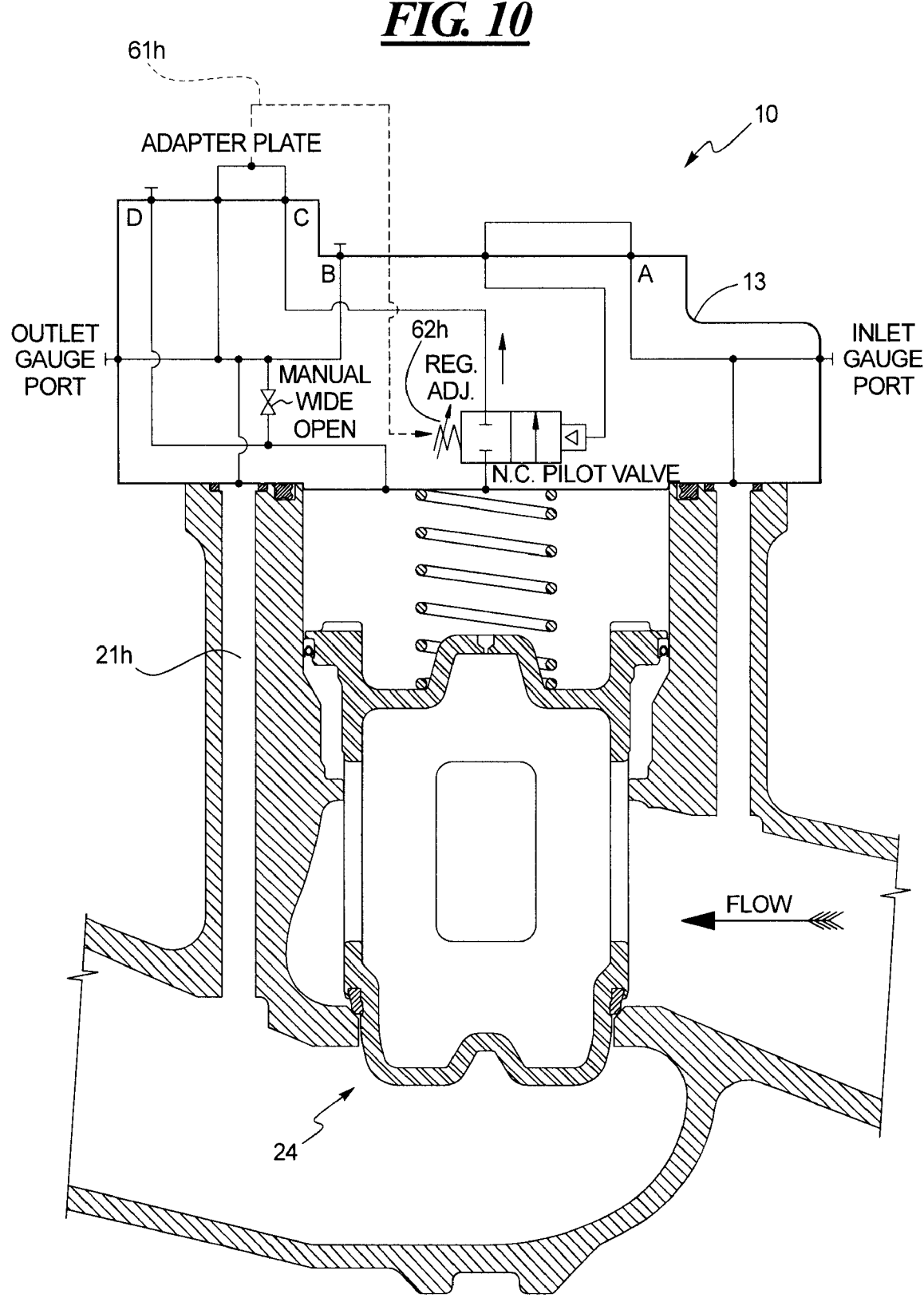
FIG. 10 is a vertical sectional view of another valve embodiment according to the present disclosure.

Referring now to FIG. 10, another embodiment of the disclosure includes an adapter plate 13 configured to cause the valve assembly 10 to function the same as FIG. 5 with the addition of a separate tubing connection 61h from the pilot regulator bonnet 62h to the outlet pressure port 21. This embodiment controls the difference between inlet pressure and outlet pressure by use of an inlet pressure pilot regulator 62h (which opens as the pressure exceeds the spring setting) except the regulator outlet pressure is piped to the pilot regulator spring housing to convert the inlet pressure pilot to a differential pressure pilot.

Figure 11:
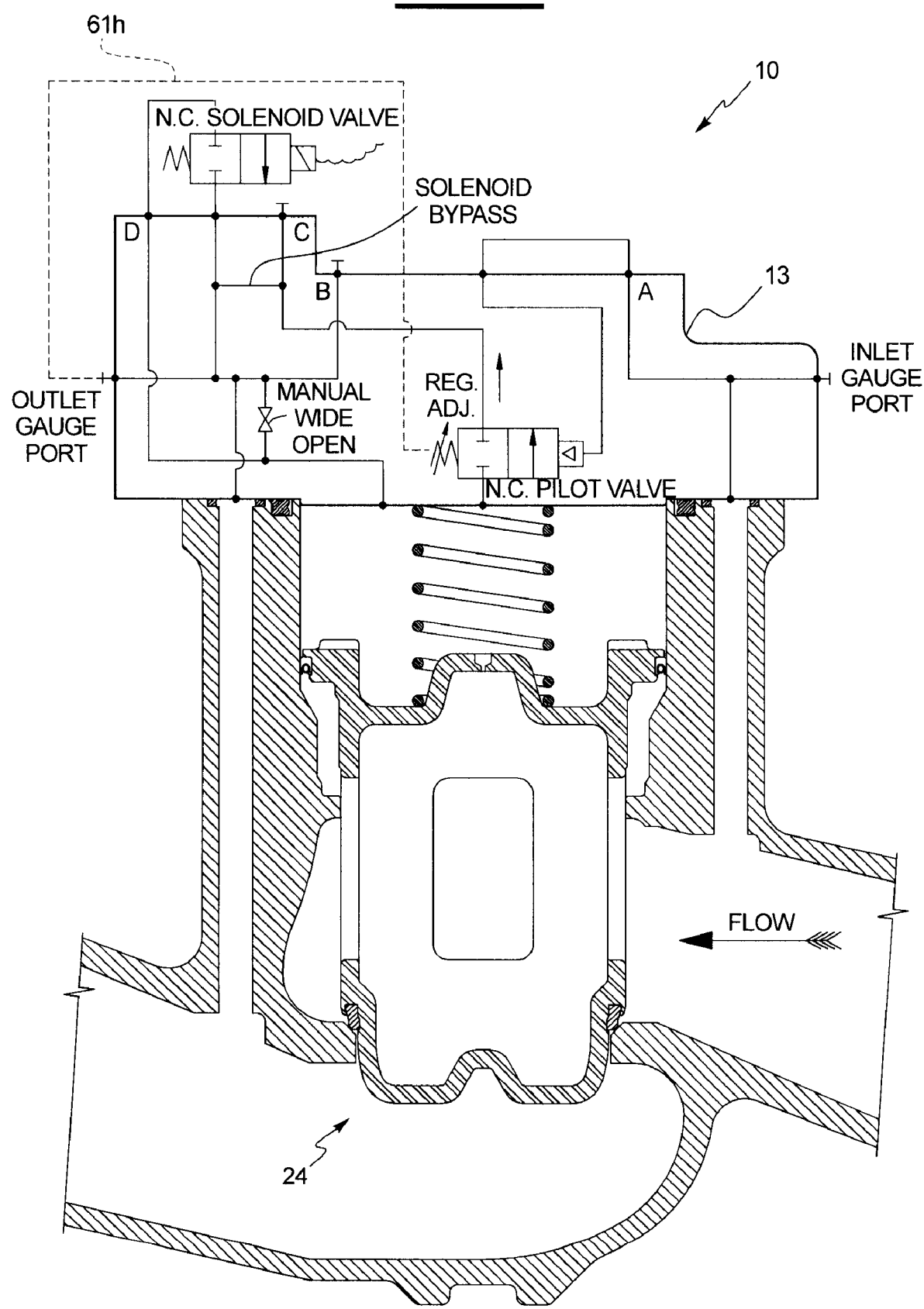
FIG. 11 is a vertical sectional view of another valve embodiment according to the present disclosure.

Referring now to FIG. 11, another embodiment includes an adapter plate 13 configured to cause the valve assembly 10 to function generally the same as FIG. 7 with the addition of the separate tubing connection 61h. This embodiment operates like FIG. 10 plus the addition of a normally closed pilot solenoid valve which, when energized to open position, permits flow from the top of the main port 24 to the main regulator outlet, thereby opening the main port 24 irregardless of the differential pressure.

Figure 12:
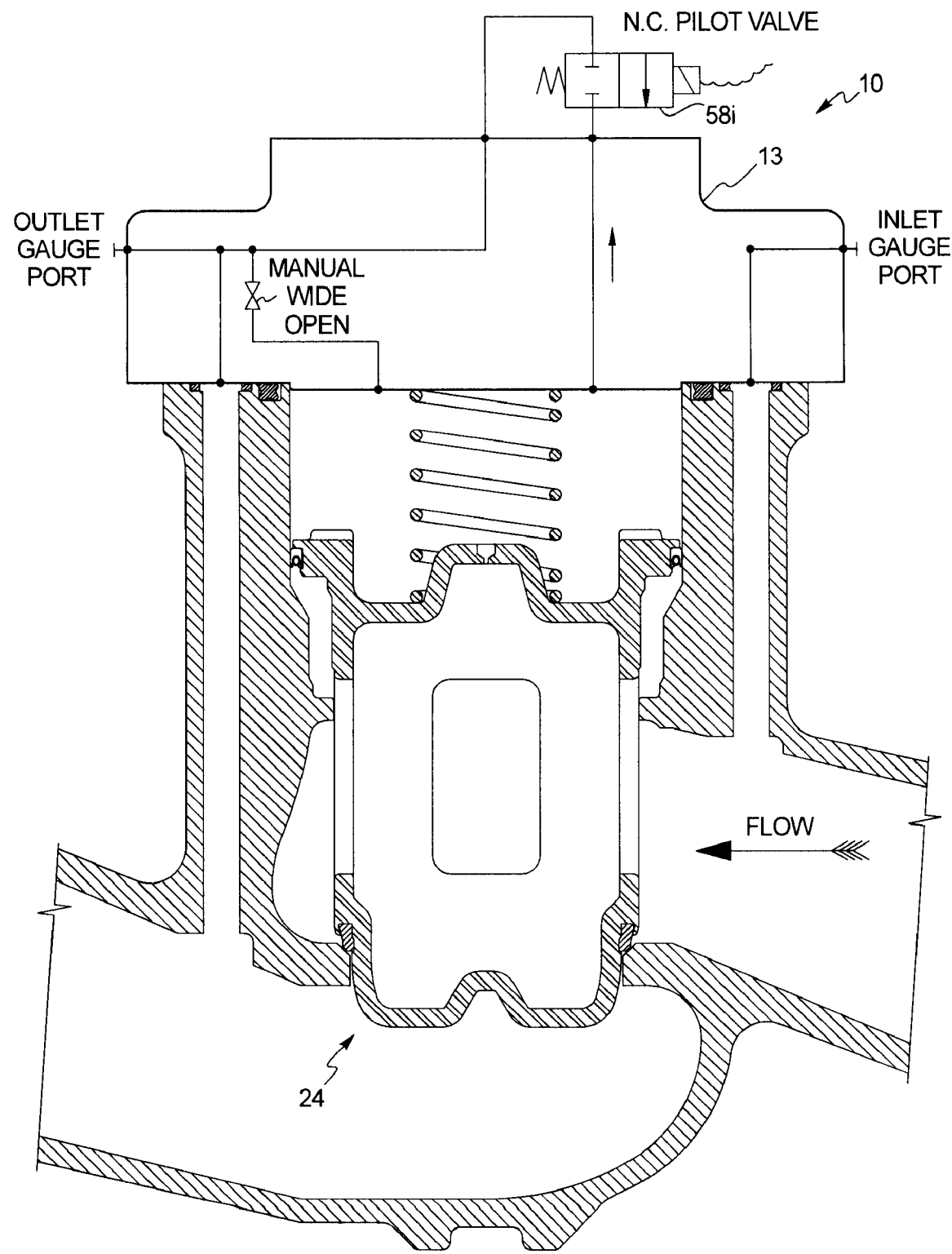
FIG. 12 is a vertical sectional view of another valve embodiment according to the present disclosure.

Referring now to FIG. 12, another embodiment includes an adapter plate 13 configured to cause the valve assembly 10 to function generally the same as FIG. 8 with the exception that shut-off solenoid 58i is used instead of normally open pilot valve. This regulator embodiment acts as an open or closed valve assembly 10 by the use of a built-in pilot solenoid valve 58i which, when energized to an open position, exhausts pressure from the top of the main port 24 to the outlet of the regulator body, which causes the main port 24 to fully open against the spring and the weight of the piston. When de-energized the pilot solenoid valve 58i closes and regulator inlet pressure bleeds through the piston center orifice and, with the assistance of the spring, closes the piston-seat.

Figure 13:
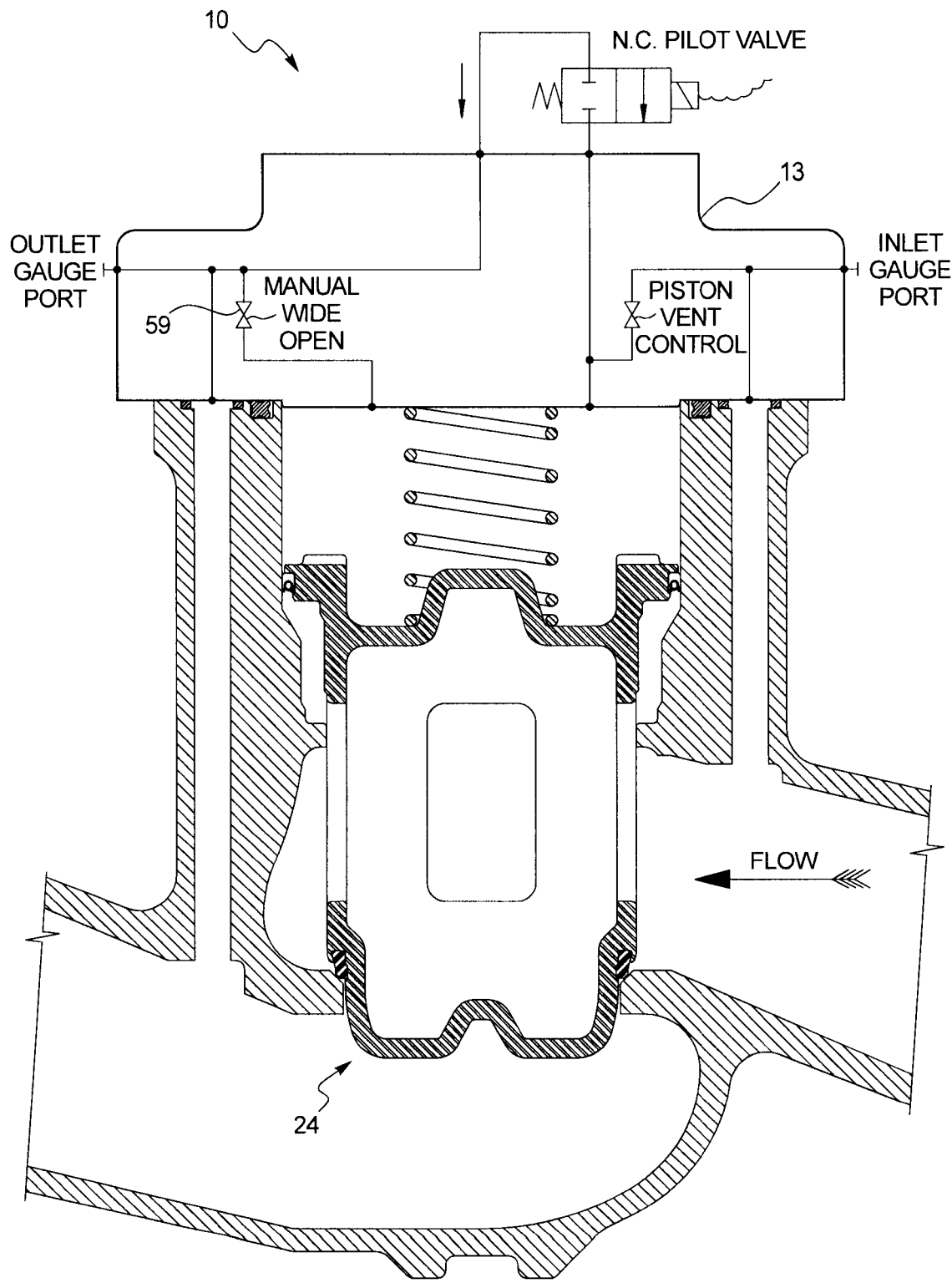
FIG. 13 is a vertical sectional view of another valve embodiment according to the present disclosure.

Referring now to FIG. 13, another embodiment includes an adaptor adapter plate 13 configured to cause the valve assembly 10 to function similarly to FIG. 12, except instead of a bleed hole in the piston, there is a built-in manual by-pass bleed valve which can control the opening and closing speed of the piston with respect to the piston-seat, as might be required by various fluid characteristics including viscosity.

Referring now to FIG. 14, another embodiment includes an adapter plate 13 configured to cause the valve assembly 10 to function generally the same as FIG. 3, except cover 13j is a simple flat plate and seal 64j is a simple polytetrafluoroethylene split ring. Expanding C-spring 115j fits into an internal groove of seal 64j. Those of skill in the art will recognize that flow through the body is reversed so the fluid is entering from below the main port orifice 24. The flow pushes the piston upward against the spring to permit flow. Even if pressure difference reverses, flow cannot return because the piston-seat is closed by the spring. The polytetrafluoroethylene split ring causes the main port 24 to be dampened against chatter. The function is that of a one-way valve, also known as a check valve by those of skill in the art.

Figure 15A:
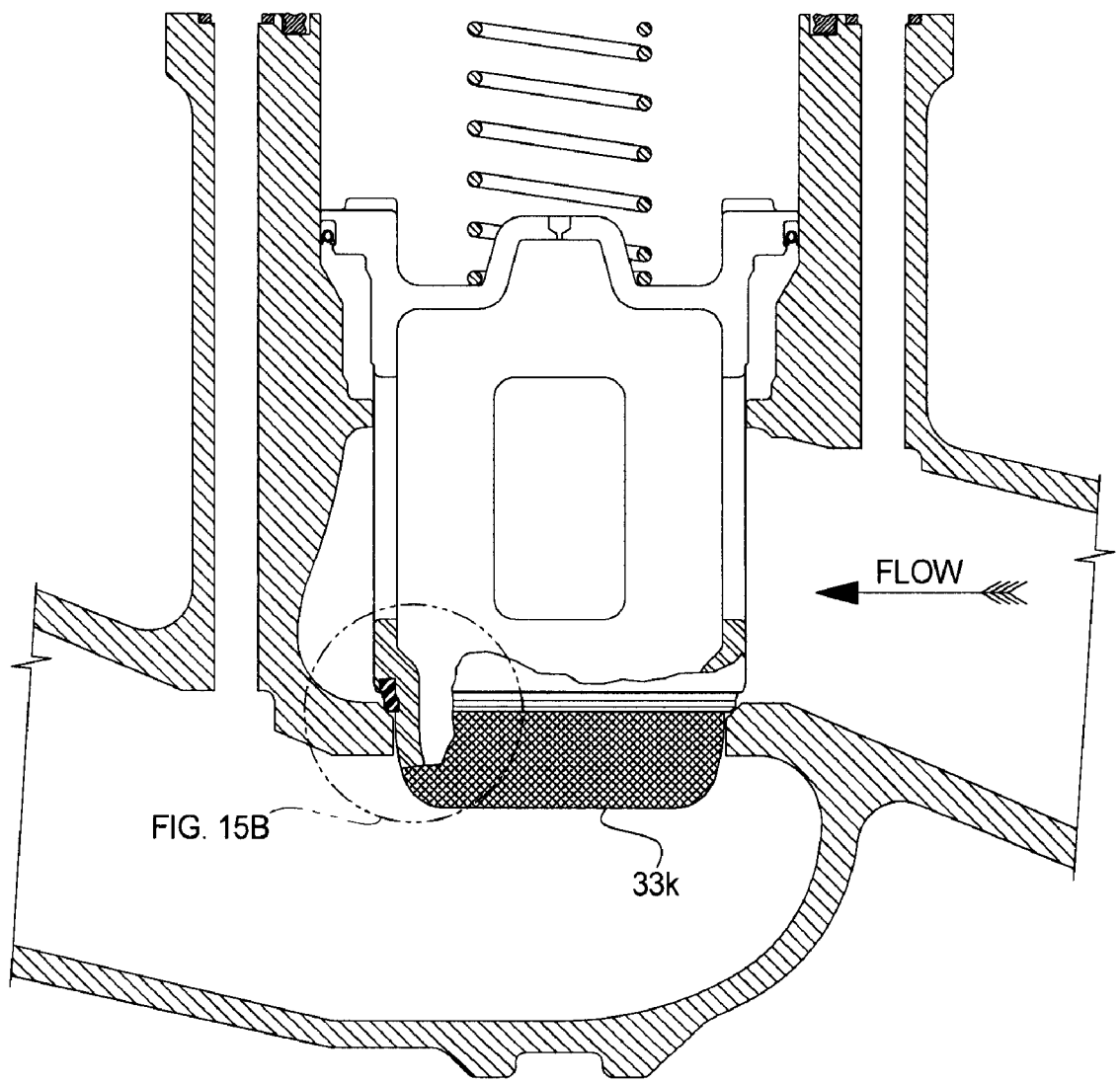
FIG. 15A is a vertical section view of another valve embodiment according to the present disclosure and FIG. 15B is a detailed view of another embodiment of the piston.
Figure 15B:
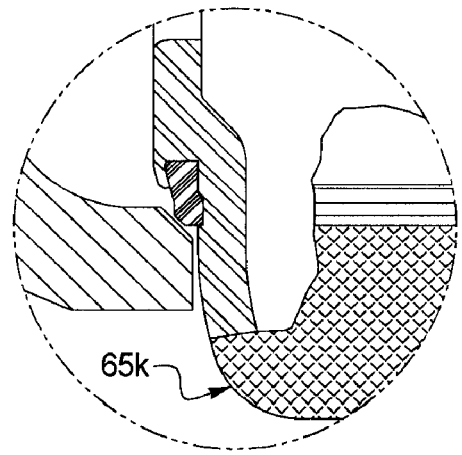

Referring now to FIG. 15, another embodiment includes an adapter plate 13 configured to cause the valve assembly 10 to function generally the same as FIG. 3, except piston-seat 33k has roughened parabolic surface 65k. In this embodiment, the flow through the parabolic shaped piston-seat 33k, at times, may be required to control at low levels. When the parabolic surface is smooth, there may be insufficient pressure drop at low flow requirements. The addition to the surface of roughness 65k will reduce the piston-seat flow by increasing turbulence.

Figure 16A:
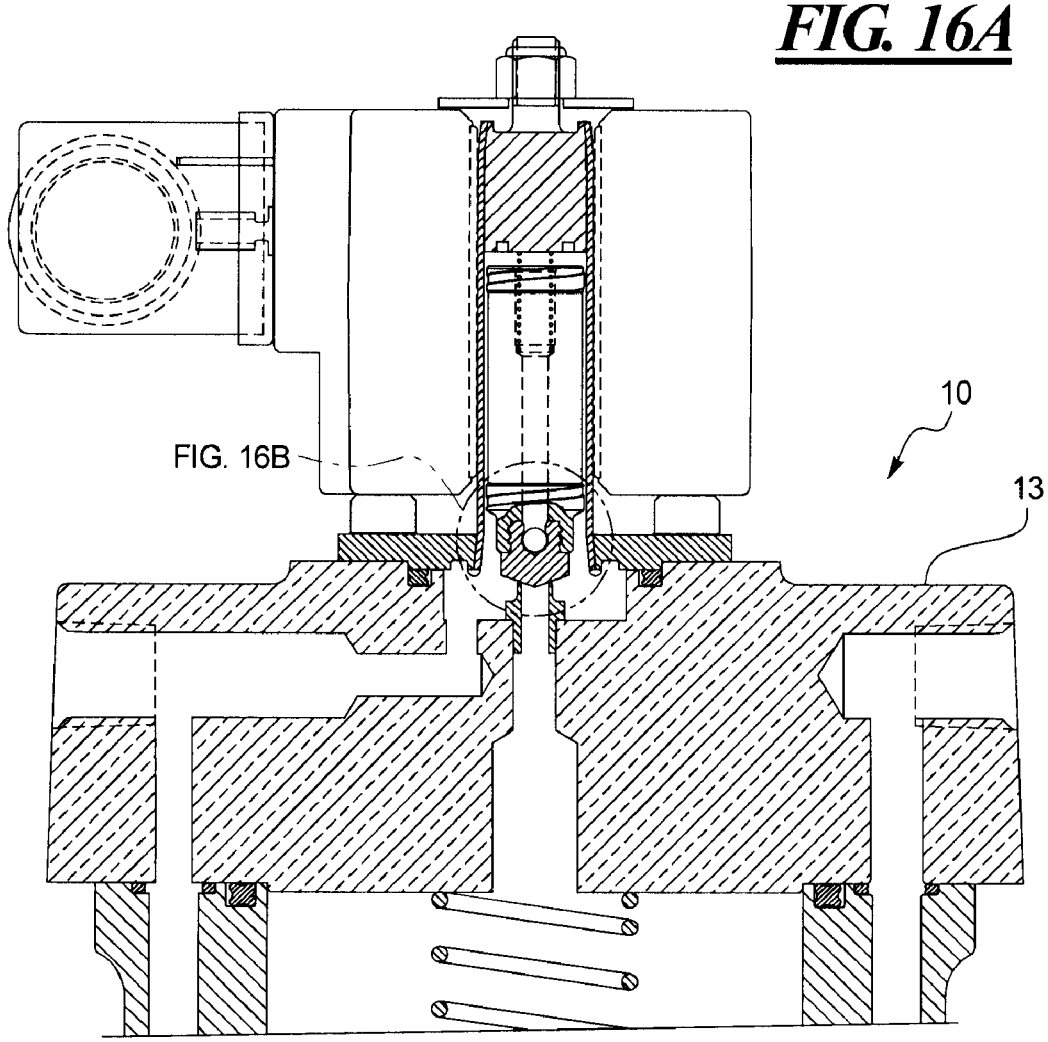
FIG. 16A is a vertical section view of another valve embodiment according to the present disclosure and FIG. 16B is a detailed view of one embodiment of a pilot solenoid valve plunger useful in connection with at least one valve embodiment of the present disclosure.
Figure 16B:
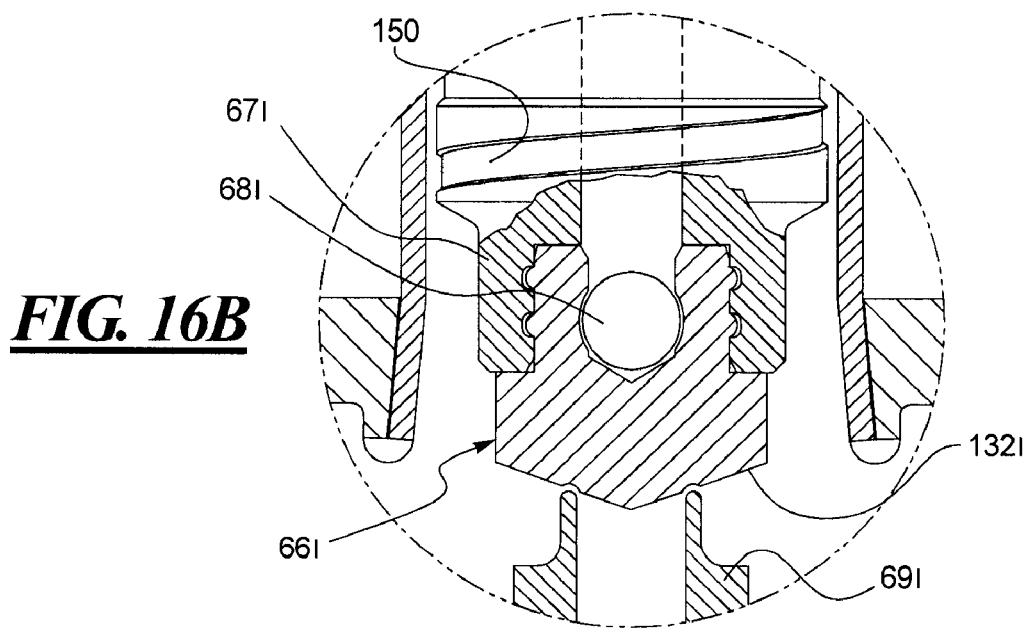

Referring now to FIG. 16, another embodiment includes an adapter plate 13 configured to control the valve assembly which includes a conical seat plug 66l (formed from polytetrafluoroethylene or any other suitable material) which is retained in a grooved solenoid plunger 67l by expansion ball bearing 68l (at its mounting end, which has a bore defined by an internal surface and an external surface with an annular rib), which is selectively contiguous with a seat orifice 69l by means of smooth tapered surface 132l. The use in this embodiment of a pressed-in ball bearing provides secure and centralized position of the pilot solenoid seat plug 66l. The tapered surface 132l of the seat plus 66l defines a conical shape and will centralize the seat plug 66l during the initial formation of the ring-shaped seat surface depression as it contacts the smooth metal surface of the seat orifice 69l. The spiral vent grooves 150 of the armature permit escape of trapped fluid above the armature. The armature includes a through-bore and an enlarged bore at a distal end with an annular groove formed therein to retain the seat plug 66l.

Figure 17:
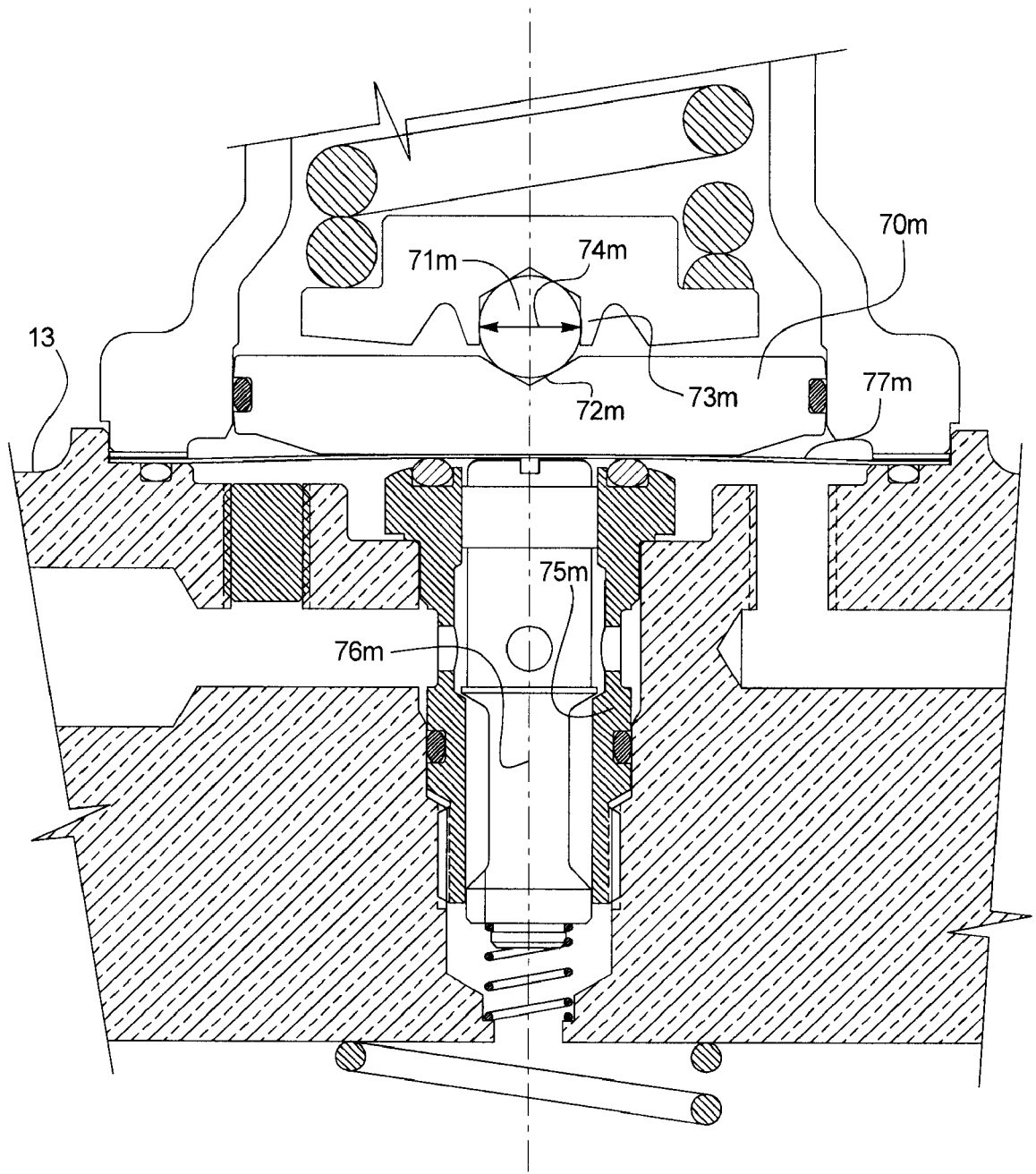
FIG. 17. is a partial, detailed vertical sectional view of a normally closed inlet regulator pilot seat useful in connection with at least one valve embodiment of the present disclosure.

Referring now to FIG. 17, another embodiment includes an adapter plate 13 configured to control the valve assembly which includes a diaphragm plate 70m in contact with retained ball bearing 71m via smooth conical surface 72m. Bent lips 73m below the center of retained ball bearing 71m have a smaller opening diameter 74m than the major diameter of retained ball bearing 71m. The normally closed cartridge 75m contains seat spool 76m which is in contact with diaphragm 77m. Rising inlet pressure lifts the diaphragm against the spring and permits flow upward from the top of the main port through the pilot seat-plunger and to the regulator outlet.

Figure 18:
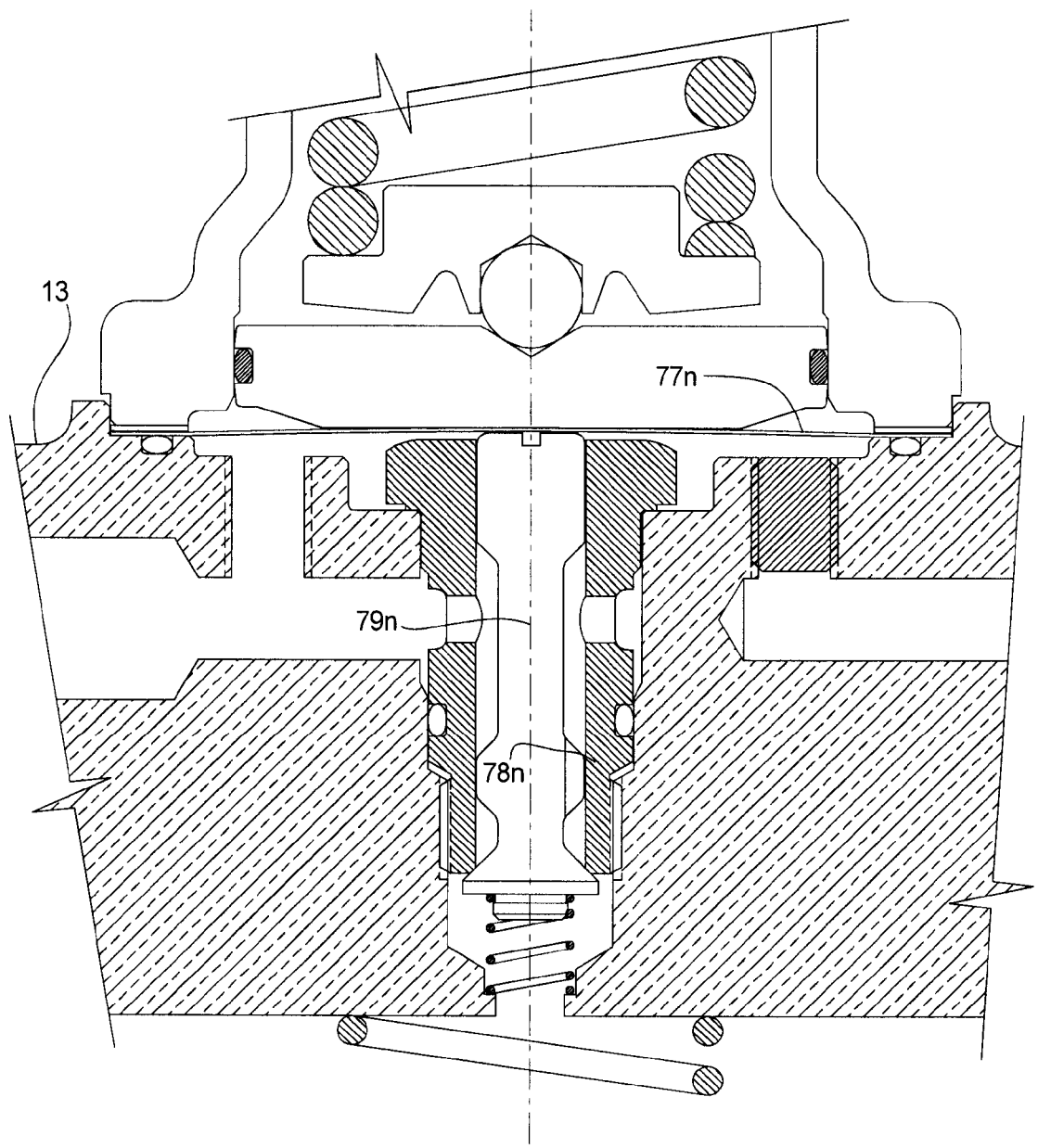
FIG. 18. is a partial, detailed vertical sectional view of a normally open outlet regulator pilot seat useful in connection with at least one valve embodiment of the present disclosure.

Referring now to FIG. 18, another embodiment includes an adapter plate 13 configured to control the valve assembly 10 which includes the generally same construction as FIG. 17 except for normally open cartridge 78h which contains different seat spool 79h. Dropping outlet pressure permits the bonnet spring to push the diaphragm 77n downward and permits flow upward from the top of the main port through the pilot seat-plunger and to the regulator outlet.

Referring now to FIG. 19, another embodiment includes an adapter plate 13 configured to control the valve assembly 10 to function so the main port 24p is held open by opening spring 81p until system pressure is admitted through inlet port 82p in gas powered bonnet adapter 13p made of aluminum or other lightweight metal, and passing through disc screen 83p and applying downward force to the top of the piston to close main valve port 24p. Flow through the valve assembly 10 can occur until a remote pressure source is supplied to the top connection 82p to push the piston downward to a closed position.

Figure 20:
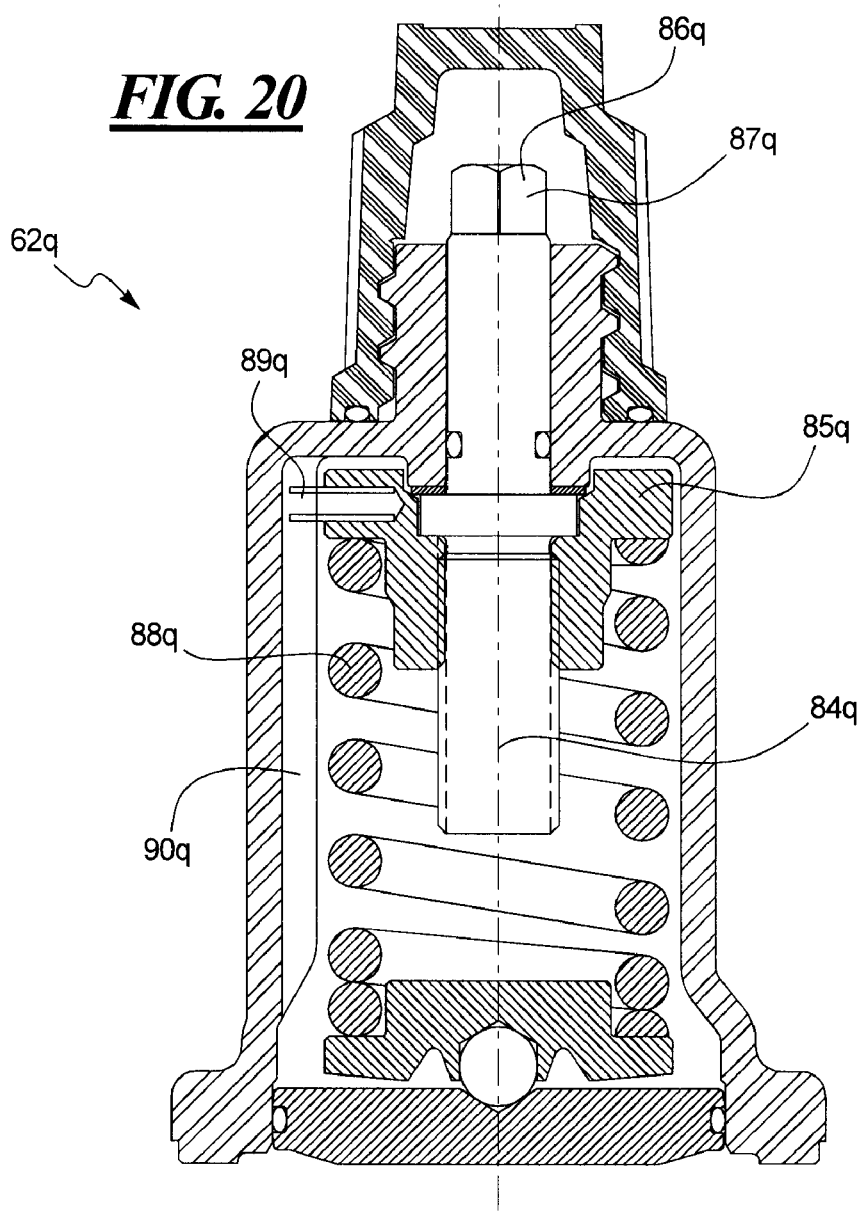
FIG. 20 is a vertical sectional view of a pilot regulator bonnet according to the present disclosure.
Figure 21:
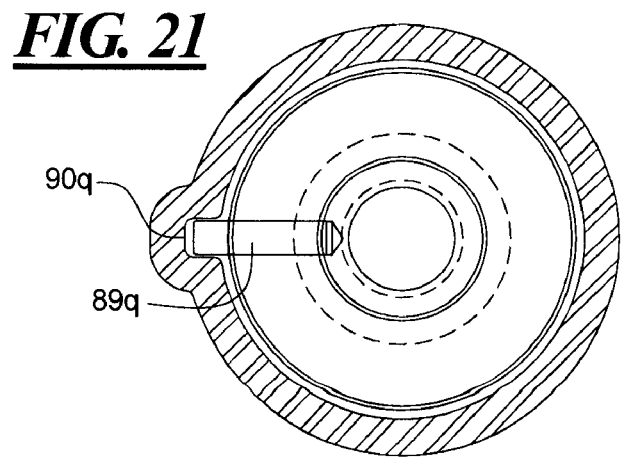
FIG. 21 is a horizontal sectional view of the pilot regulator bonnet of FIG. 19.

Referring now to FIGS. 20 and 21, another embodiment includes an adapter plate 13 configured to control the valve assembly 10 which includes the pilot regulator bonnet 62q formed from a precision investment casting using metal such as stainless steel. A threaded stem 84q mates with spring follower 85q. Turning threaded stem 84q by means of square stem 87q can compress pressure spring 88q because spring follower 85q does not rotate due to restraint of pin 89q which is guided by smooth longitudinal groove 90q which is investment cast integrally as part of pilot regulator bonnet 62q.

Figure 22:
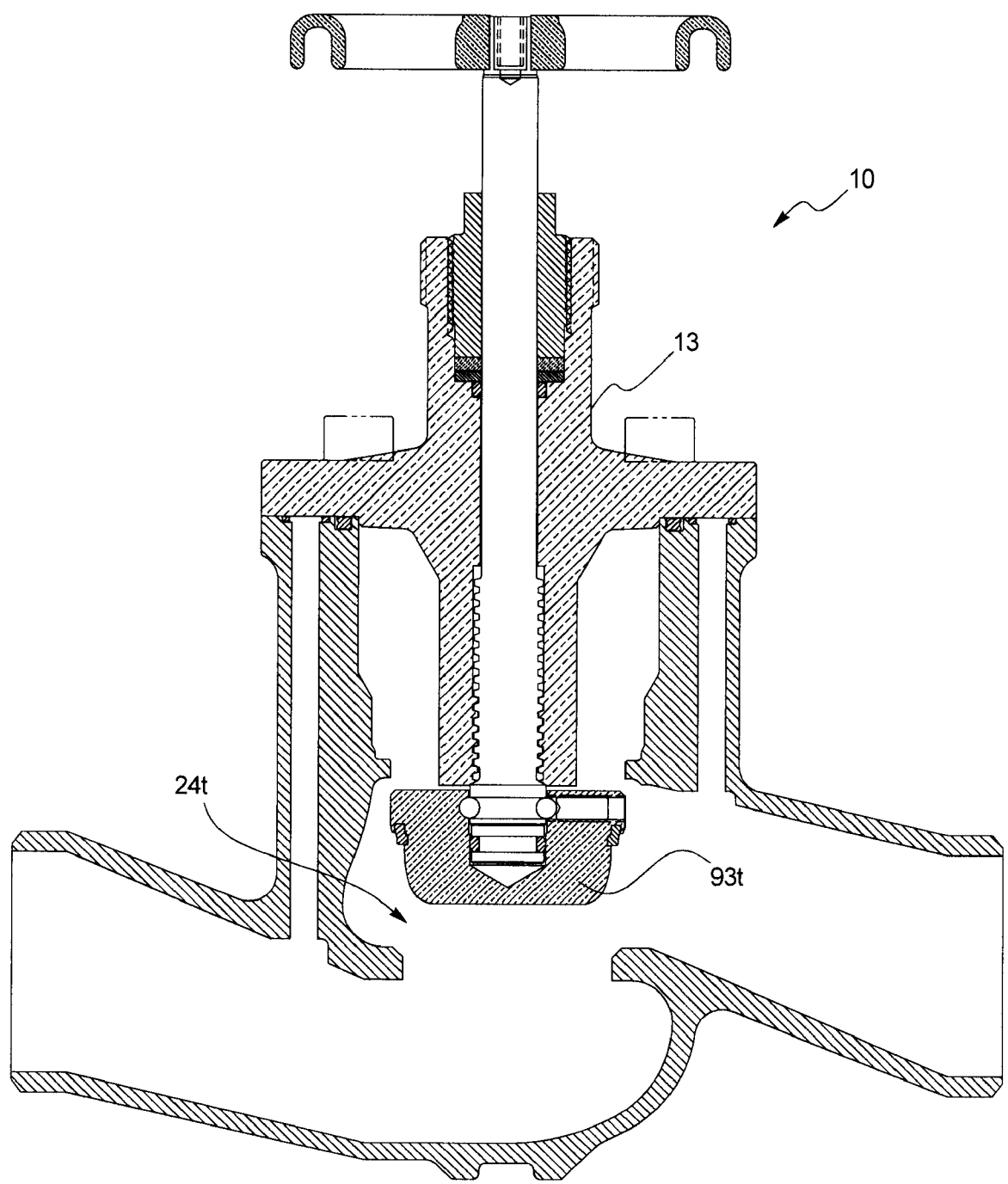
FIG. 22 is a vertical sectional view of another valve embodiment according to the present disclosure.

Referring now to FIG. 22, another embodiment includes an adapter plate 13 configured to cause the valve assembly 10 to function as a simple manually open, manually closed valve. A polytetrafluoroethylene seat retained in the aluminum parabolic plug can seal tight against the beveled seat in the body. As illustrated, the valve plug 93t has been lifted to permit full flow area through main valve port 24t.

Figure 23:
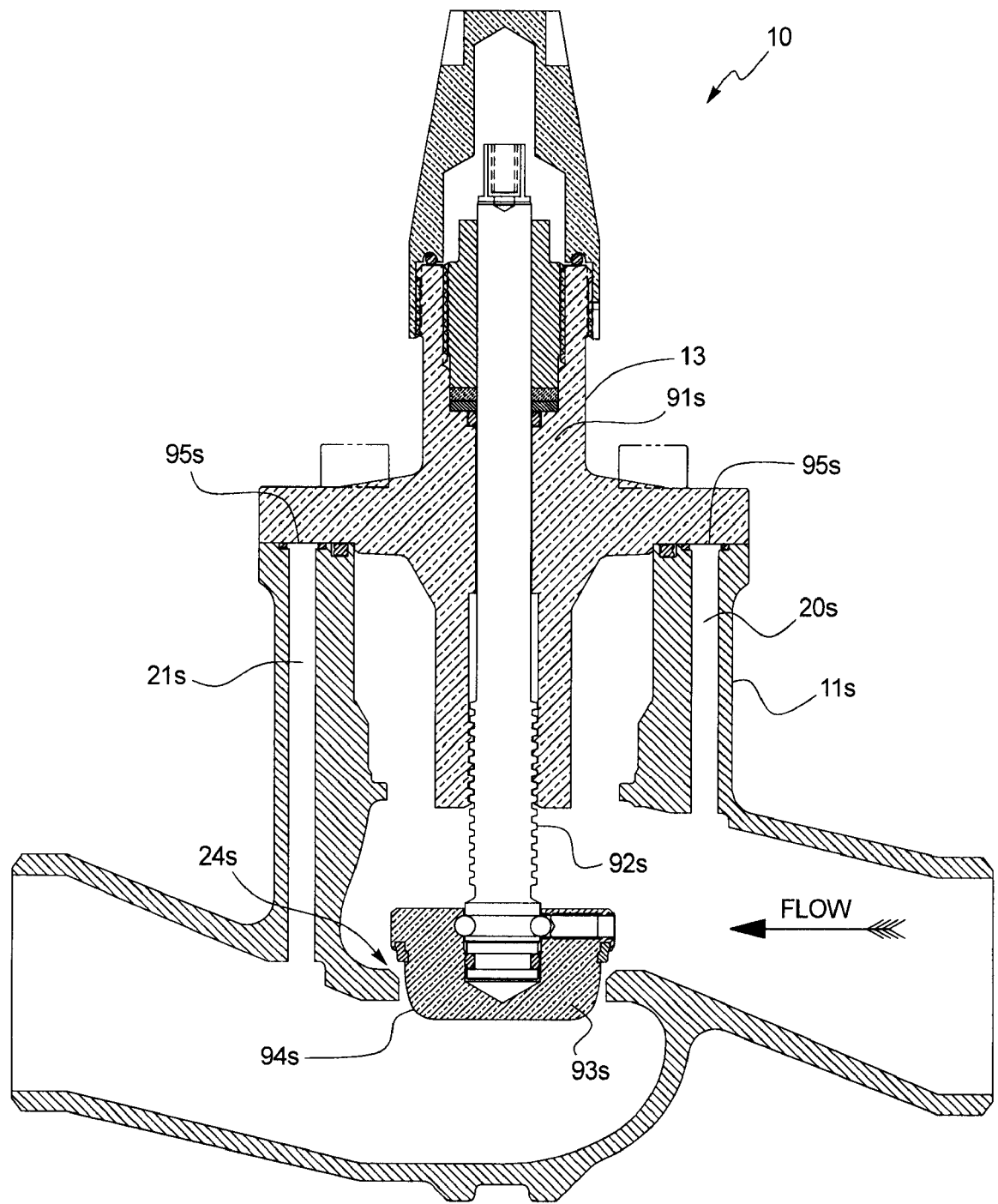
FIG. 23 is a vertical sectional view of another valve embodiment according to the present disclosure.

Referring now to FIG. 23, another embodiment includes an adapter plate 13 configured to control the valve assembly 10 wherein the valve body 11s has a threaded manual adapter 91s that has a conventional valve spindle 92s which supports valve plug 93s which has a parabolic contour 94s which can throttle flow through main valve port 24s. Port sealing surfaces 95s prevents by-passing flow through inlet pressure port 20s and outlet pressure port 21s. This embodiment is generally the same as FIG. 22 except that a bare stem and protective seal cap are used instead of a handwheel.

Figure 24:
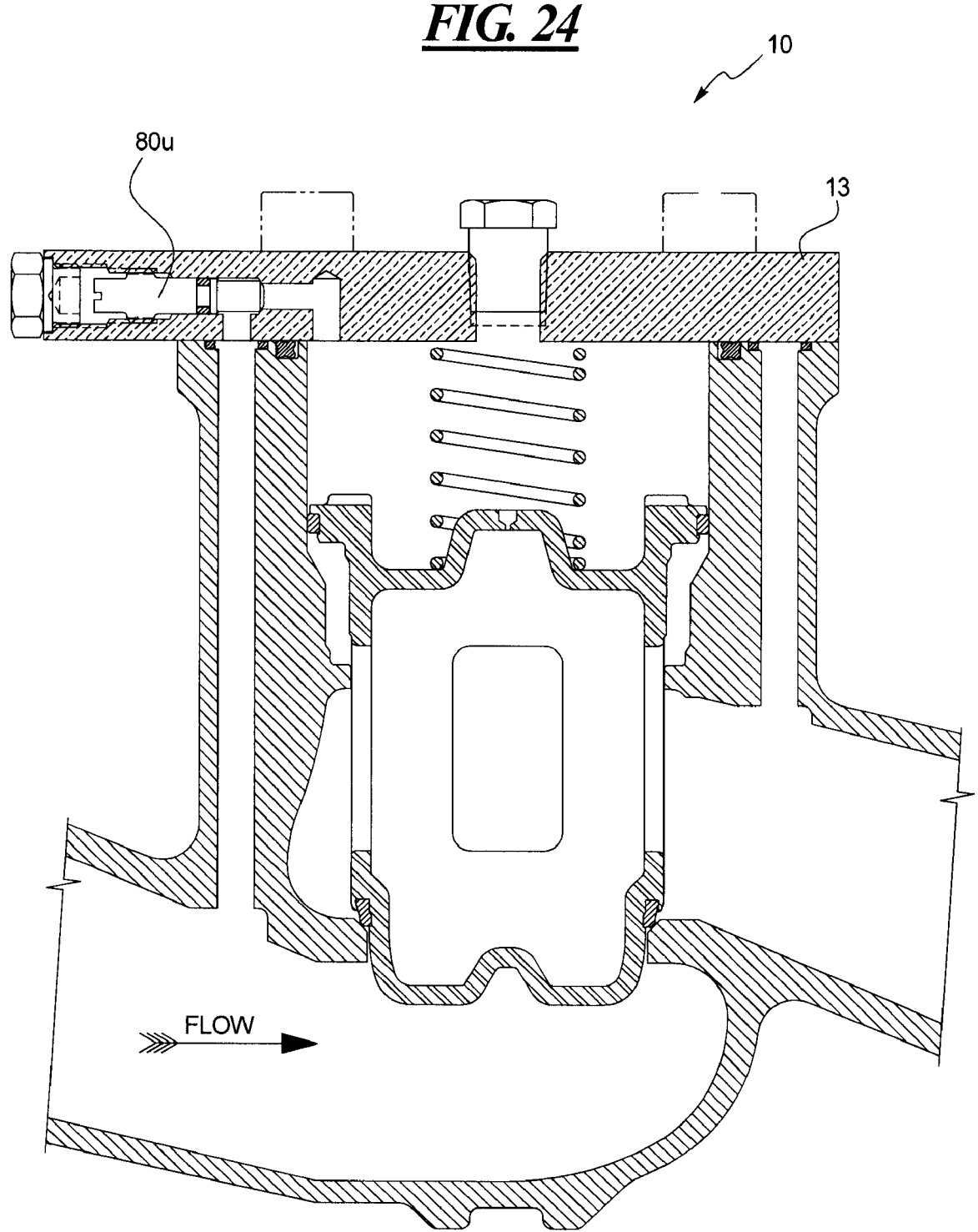
FIG. 24 is a vertical sectional view of another valve embodiment according to the present disclosure.

Referring now to FIG. 24, another embodiment includes an adapter plate 13 configured to cause the valve assembly 10 to function so that the check valve can be opened to permit reverse flow by manually opening manual wide opening spindle 80u. This embodiment is a check valve generally similar to FIG. 14 with the addition of a manual by-pass valve in the adapter plate 13 which when open permits reverse flow due to the pressure above the piston being vented to the regulator body inlet.

Figure 25:
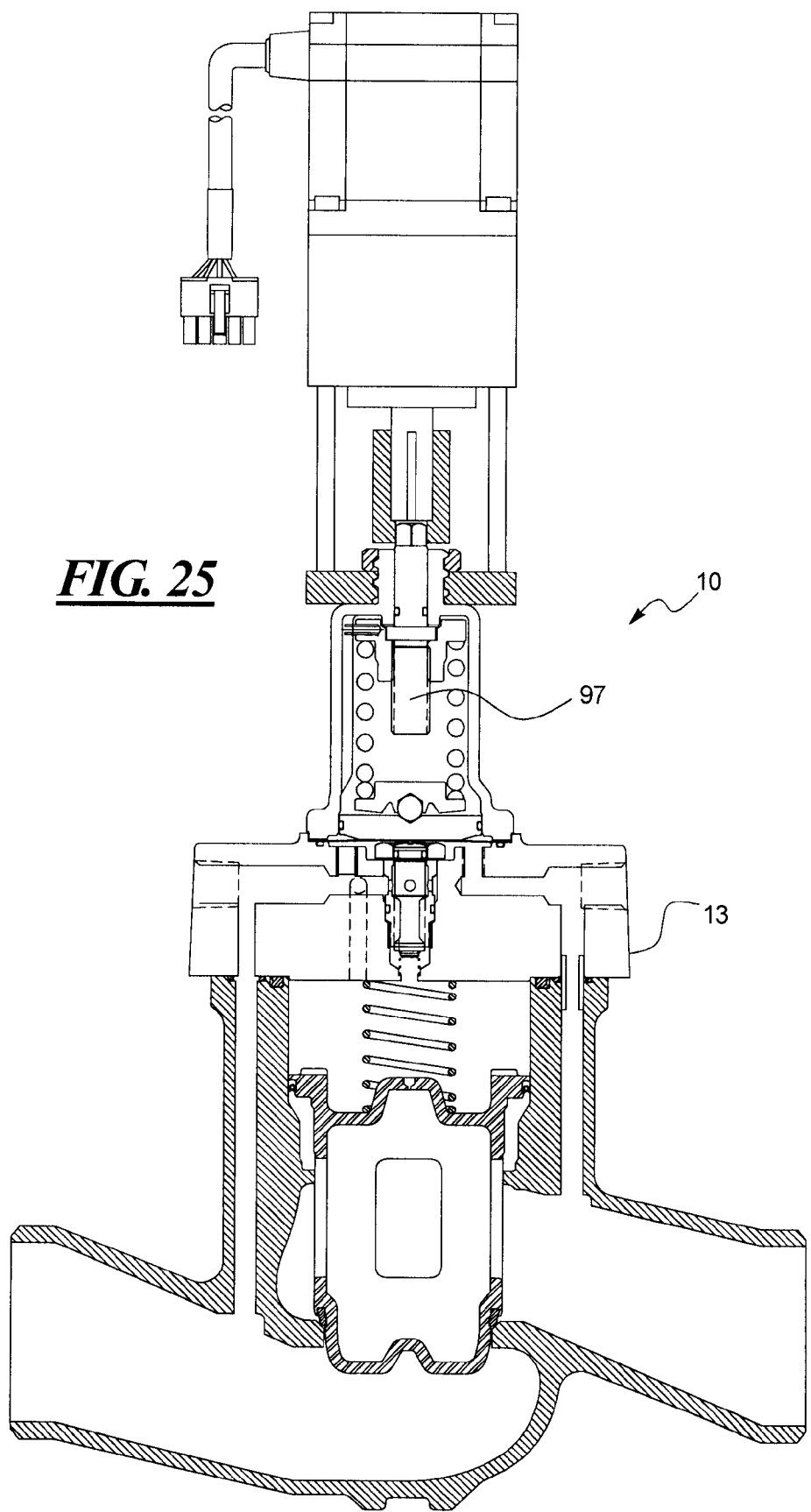
FIG. 25 is a vertical sectional view of another valve embodiment according to the present disclosure.

Referring now to FIG. 25, another embodiment includes an adapter plate 13 configured to cause the valve assembly 10 to function with a stepping motor 97 connected to pilot regulator stem for pressure setting alterations. This embodiment is generally similar to the regulator embodiment of FIG. 5 having its pressure adjusting stem connected to a stepping motor which is operated by a controller responding to temperature, humidity level, or other variable in a controlled unit or space. As the motor rotates, it can control the regulator pressure setting.

Figure 26:
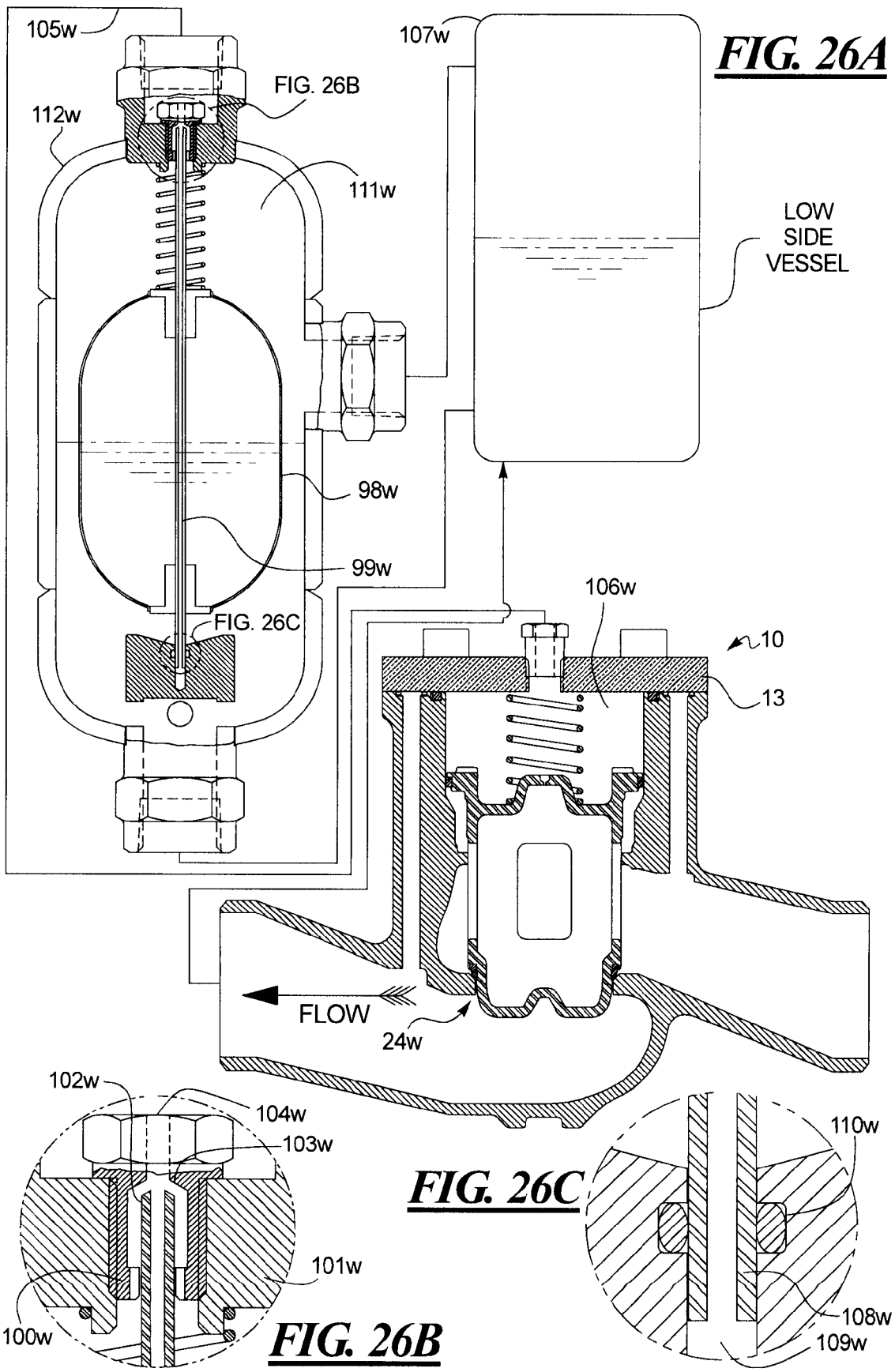
FIG. 26A is a vertical sectional view of another valve embodiment according to the present disclosure and schematic representation of additional elements of a refrigeration system, and FIGS. 26B and C are detailed views thereof.

Referring now to FIGS. 26A-C, another embodiment includes an adapter plate 13 configured to cause the valve assembly 10 to function by which a pilot liquid level control which senses the level in a low pressure accumulator vessel which is utilized as a low temperature liquid refrigerant supply for various warehouse coolers or liquid chillers. Inside of pilot level float unit 112$w$, a hollow float ball 98$w$ is bisected by hollow stem 99$w$ which is guided on the top by guide hole 100$w$ in top fitting 101$w$. As shown in detail in FIG. 26B, the upper tube end 102$w$ seats against a flat annular disc surface 103$w$ to control flow to float chamber 111$w$ through float orifice 104$w$ and pilot line 105$w$ from chamber 106$w$ to cause opening of main port 24 and permit main fluid flow into low side accumulator 107$w$. As shown in detail in FIG. 26C, the lower tube end 108$w$ is guided by lower tube chamber 109$w$ which is sealed by tube O-ring 110$w$ to maintain the same pressure as in float orifice 104$w$. In other words, the pilot is connected above and below the liquid level in the accumulator so that the float ball in the pilot tends to reach the same level as exists in the accumulator. There is a normal level position for this ball, at which point a pilot valve seat rod attached to the ball begins to open as the level falls below normal. This opens the pilot valve and removes pressure from the top of the regulator piston-seat, thereby permitting high system pressure from the annular piston area to lift the piston-seat and result in make-up refrigerant flow into the accumulator.

Figure 27:
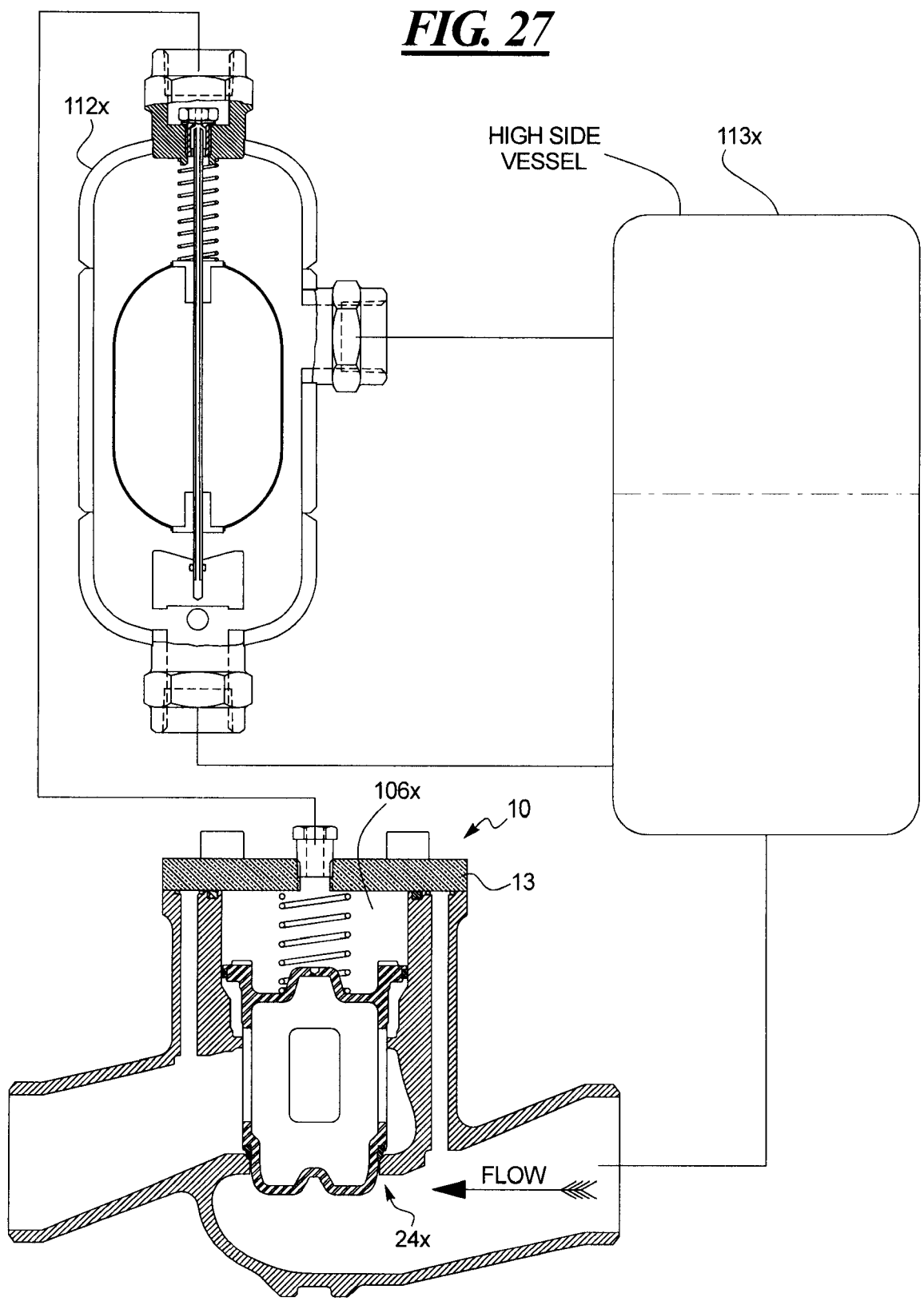
FIG. 27 is a vertical sectional view of another valve embodiment according to the present disclosure and schematic representation of additional elements of a refrigeration system.

Referring now to FIG. 27, another embodiment includes an adapter plate 13 configured to cause the valve assembly 10 to function with a different pilot liquid level control which senses the level in a high pressure liquid pipe coming from the system condenser or in a pressure vessel connected to the high pressure liquid pipe. The pilot level float unit 112$x$ is generally the same construction as pilot level float unit 112$w$ shown in FIG. 26. When connected to high side accumulator 113$x$, the pilot level float unit 112$x$ when level is low conveys pressurized gas from high side accumulator 113$x$ to chamber 106$x$ and thereby closing main port 24. When the level is above the setting of the pilot, the gas pressure feed from the pilot float regulator to the top of the piston-seat is stopped and the liquid supply from the high pressure pipe forces the seat up and open, thereby permitting liquid flow toward the low pressure part of the system.

Figure 28:
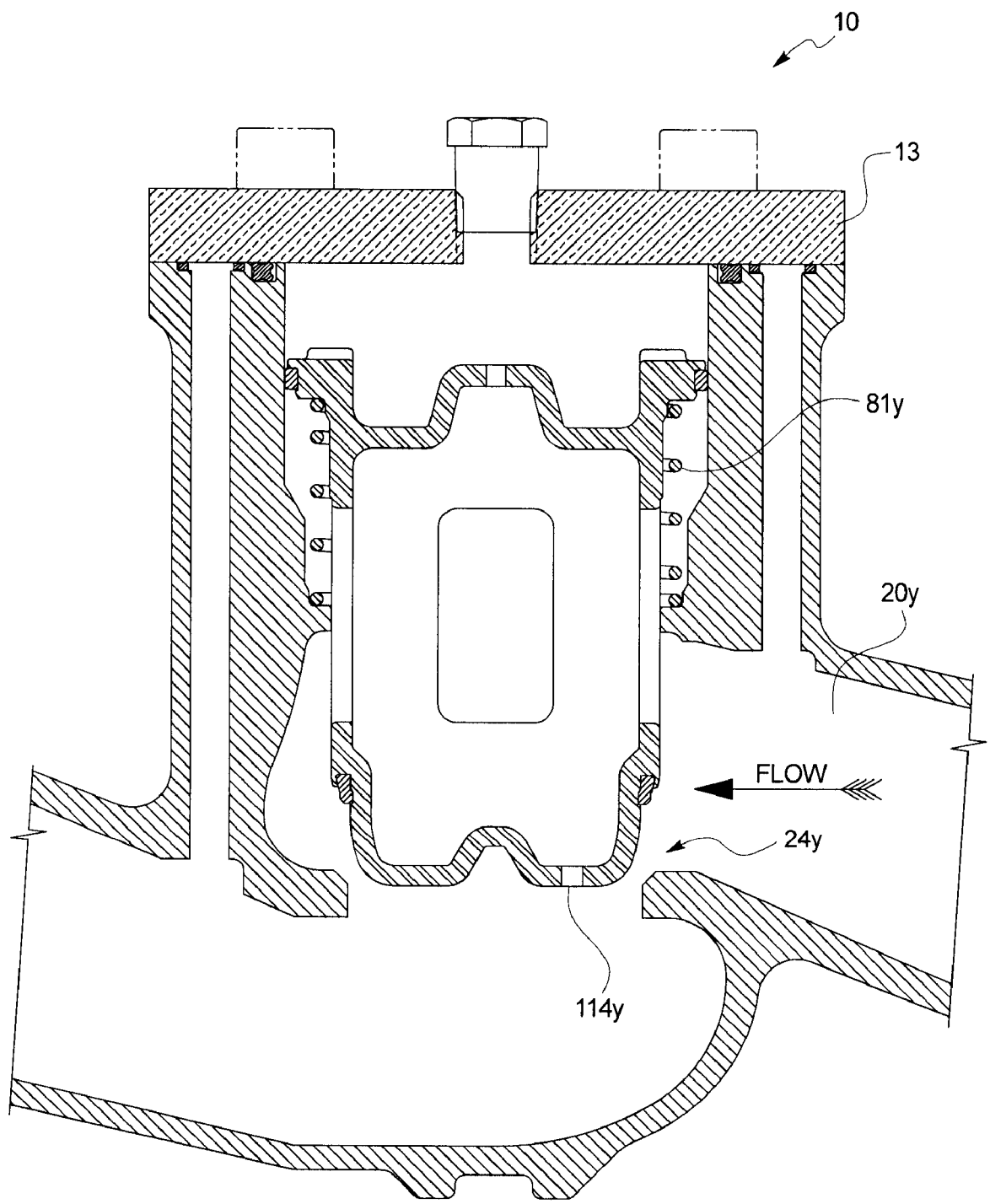
FIG. 28 is a vertical sectional view of another valve embodiment according to the present disclosure.

Referring now to FIG. 28, another embodiment includes an adapter plate 13 configured to cause the valve assembly 10 to function so that the flow from inlet pressure port 20$y$ causes a pressure drop across main valve port 24$y$ which is a function of flow quantity. As flow increases the main valve port 24$y$ tends to move closed but is impeded by spring 81$y$ whose spring rate will gradually permit the main valve port 24$y$ to close as pressure drop increases, thereby retarding any flow increase. The minimum flow orifice 114$y$ allows some flow to continue even after the pressure drop increases sufficiently to overcome the opening spring 81$y$ resistance and to close the main valve port 24$y$. Control by virtue of pressure drop across the variable area parabolic piston-seat is influenced by the annular piston spring 81$y$ which exerts opening force as the piston tends to close due to pressure difference. By the correct choice of spring factors and parabolic flow area, a reasonably constant flow of liquid will occur through this valve assembly 10. A minimum orifice 114$y$ exists through the piston-seat to control the pressure difference that will still exist even though the main port 24$y$ may temporarily close due to some disturbance.

Figure 29B:
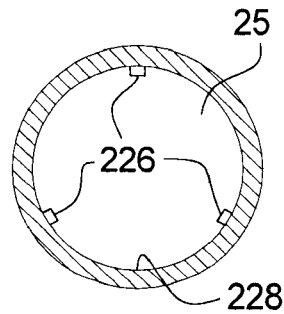

Referring now to FIGS. 29A and 29B, another embodiment in accordance with one principal aspect of the disclosure, substantially identical to the embodiment as shown in FIG. 3 except as noted herein, includes a valve body 11 with a main body 208, an inlet 23 and an outlet 25 wherein one of the inlet 23 and the outlet 25 comprising a flangeless distal end 210, 212 configured with an unmachined weldable rim 214, 216. A first pipe 220, which is a pre-determined standard size refrigeration pipe, has a first outer diameter 222 that abuts the rim 214, 216 for connection without mechanical connection in a leak-free configuration. As described above, such connection without mechanical connection in a leak-free configuration may be a weld, or more specifically in this embodiment a butt weld, a brazing, a soldering or any other suitable connection without the use of mechanical connection elements.

Another of the inlet 23 and the outlet 25 comprises a plurality of projections 226 extending from an inner surface 228 thereof to cooperatively define a stop 230. A second pipe 232, which is also a pre-determined standard size refrigeration pipe, has a second outer diameter 239 that is transition fit within the another of the inlet 23 and the outlet 25 for connection without mechanical connection in a leak-free configuration. In one embodiment, as necessary, the second outer diameter 239 is an adjacent step size of refrigeration pipe with respect to the first outer diameter 226. In another embodiment, the second outer diameter 239 is less than the first outer diameter 226. As described above, such connection without mechanical connection in a leak-free configuration may be a weld, or more specifically in this embodiment a socket weld, a brazing, a soldering or any other suitable connection without the use of mechanical connection elements.

In other embodiments, the another of the inlet 23 and the outlet 25 may also comprise another flangeless distal end 210, 212 configured, as cast, with another unmachined weldable rim 214, 216 and the one of the inlet 23 and the outlet 25 may also comprise another plurality of projections 226 extending from an inner surface 228 thereof to cooperatively define another stop 230. Accordingly, valves 11 may be configured with an unmachined weldable rim 214, 216 and a stop 230 to provide maximum flexibility for installers to fit such valves 11 into a refrigeration system. This is particularly advantageous when retrofitting valves where the refrigeration piping may be standard sized, but not identical with respect to the inlet or outlet or vice versa.

While the particular preferred embodiments have been shown and described, it will be obvious to those skilled in the art that changes and modifications may be made without departing from the teaching of the disclosure. For example, materials of construction may be changed or altered to perform the functions disclosed herein without departing from the nature of this disclosure. The matter set forth in the foregoing description and accompanying drawings is offered by way of illustration only and not as limitation. The actual scope of the disclosure is intended to be defined in the following claims when viewed in their proper perspective based on the related art.

What is claimed is:

1. A valve for integration into a refrigeration system, the valve comprising: an investment-cast, stainless-steel valve body, an investment-cast, stainless steel piston and an adapter plate; the adapter plate comprising a planar bottom surface and a plurality of openings formed in the bottom surface for communication with the main body when the adapter plate is removably connected to the investment-cast stainless-steel valve body; the investment-cast, stainless steel piston comprising an upper seal configured to engage a main body bore defined in the investment-cast, stainless-steel valve body and a lower seal configured to engage a main valve port which facilitates flow control of a refrigeration fluid; the investment-cast, stainless steel valve body comprising a main body, an inlet and an outlet; the main body comprising the main body bore generally centrally located, an inlet pressure port and an outlet pressure port, wherein the inlet pressure port provides operative communication between the inlet and the adapter plate and the outlet pressure port provides operative communication between the adapter plate and the outlet; so that the adapter plate functions to control movement of the investment-cast, stainless steel piston with respect to the main valve port; wherein the investment-cast, stainless-steel piston includes a skirt portion and the main body bore includes a web having a distal end configured to intermittently engage the skirt to guide movement of the piston; wherein the inlet and outlet each comprise a respective flangeless distal end configured, as cast, with an unmachined, weldable rim for integration without mechanical connections in a leak-free configuration.

2. The valve as recited in claim 1, wherein the investment-cast, stainless steel piston comprises a seat for receiving the lower seal defined by a retainer groove having a keyed undercut and a seat lip, wherein the seat lip is crimped after fitting the lower seal into the seat.

3. The valve as recited in claim 1, wherein the investment-cast, stainless steel piston comprises a distal end adjacent the lower seal configured with a parabolic shape and having a roughened exterior surface which defines a tortured path between the main body and the distal end.

4. The valve as recited in claim 1, wherein the upper and lower seals are formed from a material including polytetrafluoroethylene.

5. The valve as recited in claim 1, wherein the adapter plate may be removed and replaced with another adapter plate to cause the valve to perform a different function.

6. The valve as recited in claim 1, wherein the distal end has a surface finish approximately between approximately 16 and 32 rms.

7. The valve as recited in claim 1, wherein the skirt portion has a surface finish approximately between approximately 16 and 32 rms.

8. The valve as recited in claim 1, wherein the main body bore has a surface finish approximately between approximately 16 and 32 rms.

9. The valve as recited in claim 1, wherein the adapter plate is formed from a material selected from the group consisting of anodized aluminum, zinc-plated ductile cast iron and a high-strength plastic.

10. The valve as recited in claim 9, wherein the high-strength plastic is formed from a material selected from the group consisting of polysulfone blends, polyphenylsulfone, polyethersulfone, polyamides and polyamide-imide.

11. The valve as recited in claim 1, wherein a biasing element is disposed between the adapter plate and the investment-cast stainless steel piston to normally bias the investment-cast stainless steel piston away from the adapter plate.

12. The valve as recited in claim 1, wherein a biasing element is disposed between the web and the investment-cast stainless steel piston to normally bias the investment-cast stainless steel piston away from the web.

13. The valve as recited in claim 1, the adapter plate further comprising a pilot solenoid valve plunger that is selectively contiguous with a seat orifice to control a flow of a refrigeration fluid from a main body bore in the valve body through the seat orifice to the outlet wherein the pilot solenoid valve plunger comprises an armature including a through-bore and an enlarged bore at a distal end with an annular groove formed therein, a seat plug including a conical end and an opposed mounting end having a bore defined by an internal surface and an external surface with an annular rib and a ball seated within the bore to secure the seat plug to the armature such that the conical end is selectively contiguous with the seat orifice.

14. The valve as recited in claim 1, the adapter plate further comprising an investment-cast, stainless-steel pilot regulator bonnet including an unmachined longitudinal groove cast therein configured to engage a pin connected to a spring follower to prevent rotation of the spring follower during movement thereof.

15. A universal valve for integration into a refrigeration system, the universal valve comprising: an investment-cast, stainless-steel valve body, a piston and one of a plurality of adapter plates, each separate adapter plate configured to be removably connected to the investment-cast, stainless-steel valve body and to operate the valve to perform a different function; each adapter plate comprising a planar bottom surface and a plurality of openings formed in the bottom surface for communication with the main body; the piston comprising an upper seal configured to engage a main body bore defined in the investment-cast, stainless-steel valve body and a lower seal configured to engage a main valve port which facilitates flow control of a refrigeration fluid; the investment-cast, stainless steel valve body comprising a main body, an inlet and an outlet; the main body comprising the main body bore generally centrally located, an inlet pressure port and an outlet pressure port, wherein the inlet pressure port provides operative communication between the inlet and the adapter plate and the outlet pressure port provides operative communication between the adapter plate and the outlet; so that the adapter plate may function to control movement of the investment-cast, stainless steel piston with respect to the main valve port;

wherein the inlet and outlet each comprise a respective flangeless distal end configured, as cast, with an unmachined, weldable rim for integration without mechanical connections in a leak-free configuration.

16. The universal valve as recited in claim 15, wherein the investment-cast, stainless steel piston comprises a seat for receiving the lower seal defined by a retainer groove having a keyed undercut and a seat lip, wherein the seat lip is crimped after fitting the lower seal into the seat.

17. The universal valve as recited in claim 15, wherein the investment-cast, stainless steel piston comprises a distal end adjacent the lower seal configured with a parabolic shape and having a roughened exterior surface which defines a tortured path between the main body and the distal end.

18. The universal valve as recited in claim 15, wherein the upper lower seals are formed from a material including polytetrafluoroethylene.

19. The universal valve as recited in claim 15, wherein the anodized aluminum adapter plate may be removed and replaced with another anodized aluminum adapter plate to cause the valve to perform a different function.

20. The universal valve as recited in claim 15, wherein the investment-cast, stainless-steel piston includes a skirt portion and the main body bore includes a web having a distal end configured to intermittently engage the skirt to guide movement of the piston.

21. The universal valve as recited in claim 20, wherein the distal end has a surface finish approximately between approximately 16 and 32 rms.

22. The universal valve as recited in claim 20, wherein the skirt portion has a surface finish approximately between approximately 16 and 32 rms.

23. The universal valve as recited in claim 20, wherein the main body bore has a surface finish approximately between approximately 16 and 32 rms.

24. The universal valve as recited in claim 15, wherein the different function is a function selected from the group consisting of manually open, manually close, manually adjustable throttling expansion, electrically open by pilot gas solenoid orifice, electrically close by pilot gas solenoid orifice, check valve, pilot gas closing suction valve, pilot gas opening discharge valve, pilot gas closing and opening valve, inlet pressure regulator, outlet pressure regulator, differential pressure regulator, pilot electric shut-off for pressure regulators, pilot electric wide-opening for pressure regulators, flow-regulator, sealed linear motor operated valve, stepper motor reset pressure regulator, pneumatic signal reset pressure regulator, strainer, pilot operated atmospheric relief valve, temperature pilot operated valve, thermal expansion superheat control valve, motor reset pressure regulator, evaporator level control, and condenser level control.

25. The universal valve as recited in claim 15, wherein the adapter plate is formed from a material selected from the group consisting of anodized aluminum, zinc-plated ductile cast iron and a high-strength plastic.

26. The universal valve as recited in claim 25, wherein the high-strength plastic is formed from a material selected from the group consisting of polysulfone blends, polyphenylsulfone, polyethersulfone, polyamides and polyamide-imide.

27. The universal valve as recited in claim 15, wherein a biasing element is disposed between the adapter plate and the investment-cast stainless steel piston to normally bias the investment-cast stainless steel piston away from the adapter plate.

28. The universal valve as recited in claim 20, wherein a biasing element is disposed between the web and the investment-cast stainless steel piston to normally bias the investment-cast stainless steel piston away from the web.

29. A valve for integration into a refrigeration system, the valve comprising: a valve body, an investment-cast, stainless steel piston and an anodized aluminum adapter plate; the anodized aluminum adapter plate comprising a planar bottom surface and a plurality of openings formed in the bottom surface for communication with the main body when the anodized aluminum adapter plate is removably connected to the valve body; the investment-cast, stainless steel piston comprising an upper seal configured to engage a main body bore defined in the valve body and a lower seal configured to engage a main valve port which facilitates flow control of a refrigeration fluid, the valve body comprising a main body, an inlet and an outlet; the main body comprising the main body bore generally centrally located, an inlet pressure port and an outlet pressure port, wherein the inlet pressure port provides operative communication between the inlet and the anodized aluminum adapter plate and the outlet pressure port provides operative communication between the anodized aluminum adapter plate and the outlet; so that the anodized aluminum adapter plate functions to control movement of the investment-cast, stainless steel piston with respect to the main valve port; wherein the inlet and outlet each comprise a respective flangeless distal end configured, as cast, with an unmachined, weldable rim for integration without mechanical connections in a leak-free configuration.

30. The valve as recited in claim 29, wherein the investment-cast, stainless steel piston comprises a seat for receiving the lower seal defined by a retainer groove having a keyed undercut and a seat lip, wherein the seat lip is crimped after fitting the lower seal into the seat.

31. The valve as recited in claim 29, wherein the investment-cast, stainless steel piston comprises a distal end adjacent the lower seal configured with a parabolic shape and having a roughened exterior surface which defines a tortured path between the main body and the distal end.

32. The valve as recited in claim 29, wherein the upper and lower seals are formed from a material including polytetrafluoroethylene.

33. The valve as recited in claim 29, wherein the anodized aluminum adapter plate may be removed and replaced with another adapter plate to cause the valve to perform a different function.

34. The valve as recited in claim 29, wherein the investment-cast, stainless-steel piston includes a skirt portion and the main body bore includes a web having a distal end configured to intermittently engage the skirt to guide movement of the piston.

35. The valve as recited in claim 34, wherein the distal end has a surface finish approximately between approximately 16 and 32 rms.

36. The valve as recited in claim 34, wherein the skirt portion has a surface finish approximately between approximately 16 and 32 rms.

37. The valve as recited in claim 34, wherein the main body bore has a surface finish approximately between approximately 16 and 32 rms.

38. The valve as recited in claim 29, wherein the valve body is formed from a material selected from the group consisting of investment-cast stainless steel, permanent-molded, epoxy-coated machined steel and zinc-plated machined steel.

39. The valve as recited in claim 29, wherein a biasing element is disposed between the anodized aluminum adapter plate and the investment-cast stainless steel piston to normally bias the investment-cast stainless steel piston away from the anodized aluminum adapter plate.

40. The valve as recited in claim 34, wherein a biasing element is disposed between the web and the investment-cast stainless steel piston to normally bias the investment-cast stainless steel piston away from the web.

* * * * *